United States Patent [19]

Amemiya et al.

[11] Patent Number: 5,166,675
[45] Date of Patent: Nov. 24, 1992

[54] COMMUNICATION SYSTEM CARRYING OUT POLLING FOR REQUEST AND DATA SIMULTANEOUSLY AND IN PARALLEL

[75] Inventors: Shigeo Amemiya, Yokohama; Koji Tezuka, Kawasaki; Tomohiro Shinomiya, Kawasaki; Hiroshi Takeo, Kawasaki; Tetsuo Soejima, Tama; Kazuo Iguchi, Yokohama, all of Japan

[73] Assignee: Fujitsu Limited, Kawasaki, Japan

[21] Appl. No.: 726,637

[22] Filed: Jul. 2, 1991

Related U.S. Application Data

[63] Continuation of Ser. No. 486,398, Feb. 28, 1990, abandoned.

[30] Foreign Application Priority Data

Feb. 28, 1989 [JP] Japan .................. 1-46941
May 30, 1989 [JP] Japan .................. 1-134541
Jun. 16, 1989 [JP] Japan .................. 1-152392

[51] Int. Cl.$^5$ ............................. H04L 12/28
[52] U.S. Cl. ............. 340/825.08; 370/85.8; 370/95.2; 340/825.07
[58] Field of Search .......... 340/825.07, 825.06, 340/825.08, 825.51, 825.8; 370/85.8, 95.2

[56] References Cited

U.S. PATENT DOCUMENTS

| | | | |
|---|---|---|---|
| 3,702,008 | 10/1972 | Groth | 370/85.8 X |
| 3,764,981 | 10/1973 | Takasugi | 340/825.51 |
| 4,251,865 | 2/1981 | Moore et al. | 370/95.2 X |
| 4,494,111 | 1/1985 | Rocci et al. | 340/825.08 X |
| 4,500,989 | 2/1985 | Dahod | 370/85.8 X |
| 4,595,921 | 1/1986 | Wang et al. | 340/825.08 |
| 4,692,919 | 9/1987 | West, Jr. | 340/825.08 X |
| 4,726,017 | 2/1988 | Krum et al. | 370/825.8 |
| 4,742,512 | 5/1988 | Akashi et al. | 370/95.2 |
| 4,763,323 | 8/1988 | Nelson et al. | 370/95.2 |
| 4,924,461 | 5/1990 | Amemiya et al. | 370/95.2 |

FOREIGN PATENT DOCUMENTS

| | | |
|---|---|---|
| 0133567 | 2/1985 | European Pat. Off. . |
| 0060037 | 3/1989 | Japan .................. 370/85.8 |
| 253347 | 2/1990 | Japan . |
| 2162722 | 2/1986 | United Kingdom . |

Primary Examiner—Donald J. Yusko
Assistant Examiner—Brian Zimmerman
Attorney, Agent, or Firm—Staas & Halsey

[57] ABSTRACT

A communication system containing a master station and a plurality of slave stations. The master station receives a request from one of the plurality of slave stations and memorizes one or more requests from one or more slave stations. The master station also sends a request sending allowance signal which addresses one of the plurality of slave stations to give an allowance to send a request for sending data, and sends a data sending allowance signal which addresses one of the plurality of slave stations to give an allowance to send data, according to a request which is memorized. Each of the slave stations detects a request sending allowance signal which addresses its own slave station, and a data sending allowance signal which addresses its own slave station. Each of the slave stations also sends a request for sending data to the master station when its own slave station detects a request sending allowance signal which addresses its own slave station. In addition, each slave station sends data to the master station when its own slave station detects a data sending allowance signal which addresses its own slave station.

24 Claims, 24 Drawing Sheets

R: REQ, REQ-DL, R1 AND R2, OR REQ AND PR1

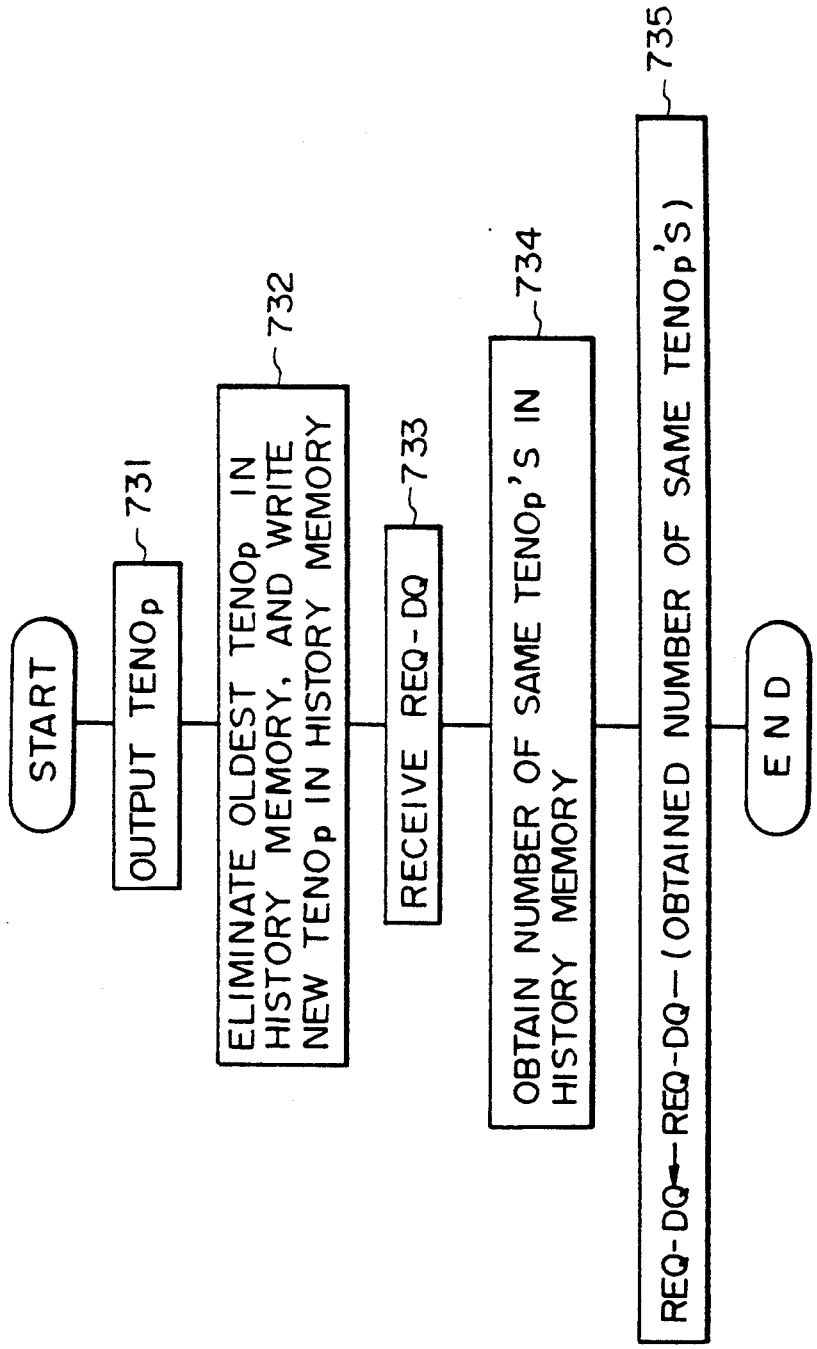

Fig. 18
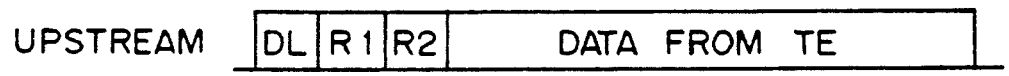
Fig. 20
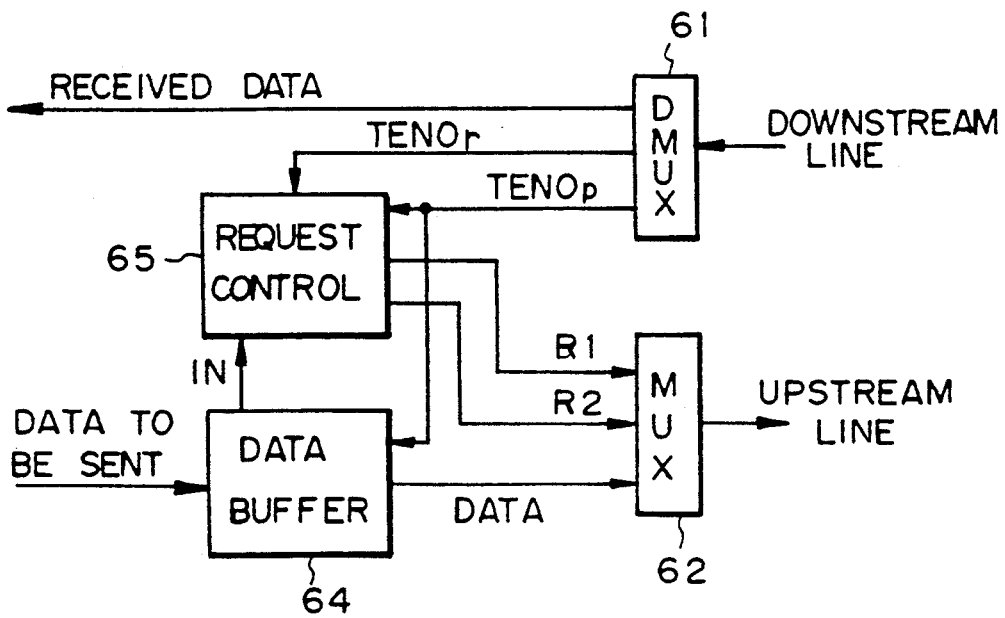

Fig. 21 n: NUMBER OF TERMINAL APPARATUSES

COMMUNICATION SYSTEM CARRYING OUT POLLING FOR REQUEST AND DATA SIMULTANEOUSLY AND IN PARALLEL

This application is a continuation of application Ser. No. 07/486,398, filed Feb. 28, 1990, now abandoned.

BACKGROUND OF THE INVENTION

(1) Field of the Invention

The present invention relates to a communication system containing a master station and a plurality of slave stations wherein data sent from the plurality of slave stations is controlled by polling from the master station.

The present invention is applicable, for example, to a B-ISDN terminal system which is connected with a Broadband Integrated Service Digital Network (B-ISDN) network, and contains a plurality of (communication) terminal apparatuses, e.g., telephone, facsimile, video conference terminal and other data terminals.

For future communication network systems using the above B-ISDN, the ATM (Asynchronous Transfer Mode) communication system is proposed wherein data is conveyed on the transmission line by packets each having a predetermined length and called a "cell". Each B-ISDN terminal system detects a vacant cell on the transmission line, and inserts data which is to be transmitted on the cell.

In a B ISDN terminal system connected with such an ISDN network using the ATM system and containing a plurality of communication apparatuses, each of the plurality of communication apparatuses may individually request to send data using one or more cells on the network, and these requests may compete with each other.

FIG. 1 shows an example of arrangement of a B-ISDN terminal system which is connected with a B-ISDN network and comprises a plurality of terminal apparatuses. In FIG. 1, reference numeral 10 denotes a network termination unit, $20_1, 20_2 \ldots 20_{n-1}, 20_n$ each denote a terminal apparatus, 30 denotes an upstream transmission line, and 40 denotes a downstream transmission line. The network termination unit 10 is provided between the ISDN network and the plurality of terminal apparatuses $20_1, 20_2, \ldots 20_{n-1}, 20_n$, and operates as an interface between each terminal apparatus and the ISDN network.

To control timings of the above data transmissions from the plurality of terminal apparatuses, a B-ISDN terminal system is proposed wherein a network termination unit in the system controls data sending operations of all the above plurality of terminal apparatuses by giving allowances to respective terminal apparatuses by polling. Namely, the network termination unit in the B-ISDN terminal system plays a role of a master station, and each of the plurality of terminal apparatuses plays a role of a slave station, regarding the above control of data transmission by polling.

(2) Description of the Related Art

FIG. 2 shows an arrangement of a communication system containing a master station and a plurality of slave stations.

The master station 1 and a plurality of slave stations $2_1, 2_2, \ldots 2_{n-1}, 2_n$ are connected by transmission lines 3 and 4 each for transmitting signals in directions from each slave station to the master station (upstream line), and from the master station to each slave station (downstream line), respectively.

In the above arrangement, the master station 1 has a polling table (not shown) which points to the addresses of the slave stations in a cyclic order, and each address which is pointed to is renewed after each polling cycle. In the prior art, the master station 1 polls (gives an allowance to send data) equally each slave station in a simple cyclic order using the polling table.

The cycle of the above polling is determined so that a data sending operation from each slave station can be completed without an interference with a signal from an other slave station.

In the conventional communication system as above, it is not considered whether or not each slave station has a request for communication with the master station at the moment of polling.

In the prior art, to solve the above problem, a request assign system is provided wherein the master station 1 sends a signal having a format as shown in FIG. 3 through the downstream line 4 to the plurality of slave stations, and the plurality of slave stations send a signal having a format as shown in FIG. 3 through the upstream line 3 to the master station 1.

In FIG. 3, DL denotes a delimiter which indicates the beginning of a text in each transmission frame, TENO denotes a terminal number to which terminal an allowance to send data is given, and DATA TO SS denotes a data which is to be sent from the master station to one of the plurality of slave stations, DATA FROM SS denotes that data is to be sent from one of the plurality of slave stations toward the master station, and R1, R2, ... Rn denote request bits from respective slave stations.

The data DATA TO SS includes in itself an address (terminal number) of a slave station to which the data is to be transmitted, and the address in the data DATA TO SS is independent from the above terminal number. The data DATA FROM SS also includes in itself an address to which the data is to be transmitted. Generally, the data DATA TO SS may be generated in the master station, or a cell which has been transmitted in the network, is transmitted as the above data DATA TO SS through the network termination unit 10 in the aforementioned B-ISDN terminal system which is connected with an ISDN network transmitting data by the ATM. Also, generally, the data DATA FROM SS may be processed in the master station, or a packet corresponding to a cell which is to be transmitted in the network, is transmitted as the above data DATA FROM SS in the above B-ISDN terminal system.

In the above request assign system, each $2_i$ (i=1, 2, ... n) of the slave stations inserts "1" in the corresponding bit Ri in a frame which is transmitted on the upstream line 3 when the slave station $2_i$ has a request to send data toward the master station 1.

However, in the above request assign system, each transmission frame on the upstream line includes a region comprised of the above plurality of request bits R1, R2, ... Rn. The length of the region of the request bits R1, R2, ... Rn increases with the number of the slave stations, i.e., the transmission efficiency decreases with the number of the slave stations. Further, in the above request assign system, the master station cannot obtain the information on how much data is requested to be transmitted between the master station and each slave station at the moment of polling, and the master station cannot be informed of the priorities of data transmission from respective slave stations.

SUMMARY OF THE INVENTION

A first object of the present invention is to provide a communication system between a master station and a plurality of slave stations, wherein communications are carried out with high efficiency as a total.

A second object of the present invention is to provide a communication system between a master station and a plurality of slave stations, wherein, the master station can control data transmissions from the plurality of slave stations according to the priorities of requests for data transmissions from the plurality of slave stations.

A third object of the present invention is to provide a communication system between a master station and a plurality of slave stations, wherein, the master station can control data transmissions from the plurality of slave stations according to the quantities of data which are required to be transmitted from the plurality of slave stations.

A fourth object of the present invention is to provide a communication system between a master station and a plurality of slave stations, wherein, an exclusive use of the communication system by a slave station, is prevented.

According to the first aspect of the present invention, there is provided a communication system containing master station, a plurality of slave stations, a transmission line for transmitting a signal between the master station and the plurality of slave stations, and having the following construction. The master station contains: a request sending allowance signal sending means for sending a request sending allowance signal which addresses one of the plurality of slave stations to give an allowance to send a request for sending data, on the transmission line; a request receiving means for receiving a request from one of the plurality of slave stations; a request memorizing means for memorizing one or more requests from one or more slave stations; and a data sending allowance signal sending means for sending a data sending allowance signal which addresses one of the plurality of slave stations to give an allowance to send data, on the transmission line, according to a request which is memorized in the request memorizing means. Each of the slave stations comprises a request sending allowance signal detecting means for detecting a request sending allowance signal which addresses its own slave station, on the transmission line; a data sending allowance signal detecting means for detecting a data sending allowance signal which addresses its own slave station, on the transmission line; a request sending means for sending a request for sending data on the transmission line to the master station when its own slave station detects a request sending allowance signal which addresses its own slave station; and a data sending means for sending data on the transmission line to the master station when its own slave station detects a data sending allowance signal which addresses its own slave station.

In the second aspect of the present invention, the following improvements may be further provided.

(a) Each of the slave stations may further comprise an additional request sending means for sending an additional request for sending further data on the transmission line to the master station when its own slave station detects a data sending allowance signal which addresses its own slave station, and sends data corresponding to the data sending allowance signal.

(b) Corresponding to the above (a), the master station may further comprise an additional request detecting means for detecting the additional request which is sent from a slave station.

(c) Responding to the above (b), the data sending allowance signal sending means in the master station may send with first priority a data sending allowance signal to a slave station which has sent the additional request, when the additional request is detected.

(d) Further, in the above construction of (c), the data sending allowance signal sending means may comprise a successive allowances limiting means for changing an address of the data sending allowance signal to another slave station from which a request for sending data is memorized in the request memorizing means, when a predetermined number of successive allowances are output to a slave station.

(e) In the construction of (d), a priority may be assigned for each of the slave stations regarding a data sending operation, and the data sending allowance signal sending means may comprise: a priority comparing means for comparing the priority of a slave station to which currently a data sending allowance signal is output, with a priority of a slave station from which a request for sending data is received; and an address changing means for changing an address of the data sending allowance signal to the slave station from which the request for sending data is received, when the priority of the slave station to which currently a data sending allowance signal is output, is lower than the priority of the slave station from which the request for sending data is received.

(f) In the construction of (e), wherein each of the request and the additional request includes information of the priority of the slave station from which the request for sending data is output.

(g) In the construction of the first aspect of the present invention, a priority may be assigned for each of the slave stations regarding a data sending operation, and each of the plurality of slave stations may further comprise a priority signal output means for outputting the assigned priority when sending the request for sending data, on the transmission line; the request memorizing means in the master station further memorizes the priority for each request memorized therein; and the data sending allowance signal sending means sends the data sending allowance signals in the order of the priorities of the slave stations which are memorized in the request memorizing means.

(h) In the construction of the first aspect of the present invention, the master station may further comprise a polling address dispersing means for dispersing the addresses of the request sending allowance signal and the data sending allowance signal.

(i) In the construction of (h), the polling address dispersing means may make polling addresses in the request sending allowance signal and the data sending allowance signal in a current polling cycle different from each other.

(j) In the construction of (h), the polling address dispersing means may comprise: a preceding polling address memorizing means for memorizing polling addresses in a predetermined number of preceding polling cycles; and a polling address control means for making polling addresses in the request sending allowance signal and the data sending allowance signal in a current polling cycle different from each other and different from the polling addresses in the predetermined number of preceding polling cycles.

(k) In the construction of the first aspect of the present invention, the master station further comprises a polling address controlling means for making the address of the data sending allowance signal equal to the request sending allowance signal when no request is memorized in the request memorizing means.

(l) In the construction of the first aspect of the present invention, the request sending allowance signal sends the request sending allowance signals at a lower frequency than the frequency the data sending allowance signals are sent.

According to the second aspect of the present invention, there is provided a communication system comprising a master station, a plurality of slave stations, and a transmission line for transmitting a signal between the master station and the plurality of slave stations, and having the following construction. The master station comprises a requested quantity sending allowance signal sending means for sending a requested quantity sending allowance signal which addresses one of the plurality of slave stations to give an allowance to send a quantity of data requested to be sent, on the transmission line; a data quantity receiving means for receiving the quantity of data from one of the plurality of slave stations; a requested quantity memorizing means for memorizing one or more quantities of data from one or more slave stations; and a data sending allowance signal sending means for sending a data sending allowance signal which addresses one of the plurality of slave stations to give an allowance to send data, on the transmission line, according to a data quantity which is sent from the slave station, and which is memorized in the request memorizing means. Each of the slave stations comprises a requested quantity sending allowance signal detecting means for detecting a requested quantity sending allowance signal which addresses its own slave station, on the transmission line; a data sending allowance signal detecting means for detecting a data sending allowance signal which addresses its own slave station, on the transmission line; a requested data quantity sending means for sending a quantity of data requested to be sent from its own slave station, on the transmission line to the master station when its own slave station detects a requested quantity sending allowance signal which addresses its own slave station; and a data sending means for sending data on the transmission line to the master station when its own slave station detects a data sending allowance signal which addresses its own slave station.

In the second aspect of the present invention, the following improvements may be further provided.

(m) In the construction of the second aspect of the present invention, the master station may further comprise: a history memory means for memorizing a history of the data sending allowance signals which are output in a certain time duration, and the time duration is predetermined corresponding to a time from a moment a requested quantity sending allowance signal is output from the master station, to a moment a slave station addressed by the requested quantity sending allowance signal detects the requested quantity sending allowance signal; and a memorized quantity correcting means for subtracting a quantity corresponding to a number of data sending allowance signals to a slave station, which are memorized in the history memory, from the quantity of data which is received from the slave station, before storing the quantity in the requested quantity memorizing means.

(n) In the construction of the second aspect of the present invention, wherein each of the slave stations further comprises an additional request sending means for sending an additional request for sending a further data on the transmission line to the master station when its own slave station detects a data sending allowance signal which addresses its own slave station, and sends data corresponding to the data sending allowance signal.

(o) In the construction of (n), the master station further comprises an additional request detecting means for detecting the additional request which is sent from a slave station.

(p) In the construction of (o), the data sending allowance signal sending means in the master station sends with first priority a data sending allowance signal to a slave station which has sent the additional request, when the additional request is detected.

(q) In the construction of (p), the data sending allowance signal sending means comprises, a successive allowances limiting means for changing an address of the data sending allowance signal to another slave station from which a quantity of data requested to be sent is memorized in the requested quantity memorizing means, when a predetermined number of successive allowances are output to a slave station.

(r) In the construction of (o), a priority may be assigned for each of the slave stations regarding a data sending operation, and the data sending allowance signal sending means may comprise: a priority comparing means for comparing the priority of a slave station to which a data sending allowance signal is currently output, with a priority of a slave station from which a request for sending data is received; and an address changing means for changing an address of the data sending allowance signal to the slave station from which the request for sending data is received, when the priority of the slave station to which a data sending allowance signal is currently output, is lower than the priority of the slave station from which the request for sending data is received.

(s) In the construction of (r), each of the quantity of data requested to be sent and the additional request further includes information of the priority of the slave station from which the request for sending data is output.

(t) In the construction of the second aspect of the present invention, a priority may be assigned for each of the slave stations regarding a data sending operation, and each of the plurality of slave stations may further comprise a priority signal output means for outputting the assigned priority when sending the request for sending data, on the transmission line. The request memorizing means in the master station further memorizes the priority for each request memorized therein, and the data sending allowance signal sending means may send the data sending allowance signals in the order of the priorities of the slave stations which are memorized in the request memorizing means.

(u) In the construction of the second aspect of the present invention, the master station further comprises a polling address dispersing means for dispersing the addresses of the requested quantity sending allowance signal and the data sending allowance signal.

(v) In the construction of (u), the polling address dispersing means may make polling addresses in the requested quantity sending allowance signal and the data sending allowance signal in a current polling cycle different from each other.

(w) In the construction of (v), the polling address dispersing means may comprise: a preceding polling address memorizing means for memorizing polling addresses in a predetermined number of preceding polling cycles; and a polling address control means for making polling addresses in the requested quantity sending allowance signal and the data sending allowance signal in a current polling cycle different from each other and different from the polling addresses in the predetermined number of preceding polling cycles.

(x) In the construction of the second aspect of the present invention, the master station may further comprise a polling address controlling means for making the address of the data sending allowance signal equal to the requested quantity sending allowance signal when no request is memorized in the requested quantity memorizing means.

(y) In the construction of the second aspect of the present invention, the requested quantity sending allowance signal may send the requested quantity sending allowance signals at a lower frequency than the frequency the data sending allowance signals are sent.

BRIEF DESCRIPTION OF THE DRAWINGS

In the drawings:

FIG. 12 shows an operation for carrying out the correction of the memorized data quantity in the network termination unit 10 in the third embodiment of the present invention;

FIG. 18 shows a fourth set of formats of the transmission frames, which are used in the sixth embodiment of the present invention;

FIG. 20 shows a construction of each terminal apparatus in the sixth embodiment of the present invention;

FIG. 21 shows an example of flow of signals in the construction of the network termination unit 10 of FIG. 19;

DESCRIPTION OF THE PREFERRED EMBODIMENTS (1) Basic format of transmission frame

Before describing the preferred embodiment of the present invention, first, the basic set of formats of the transmission frame which is transmitted from a master station to a plurality of slave stations, and the transmission frame which is transmitted from one or more of the slave stations to a master station, according to the present invention, are explained below.

Figure 4:
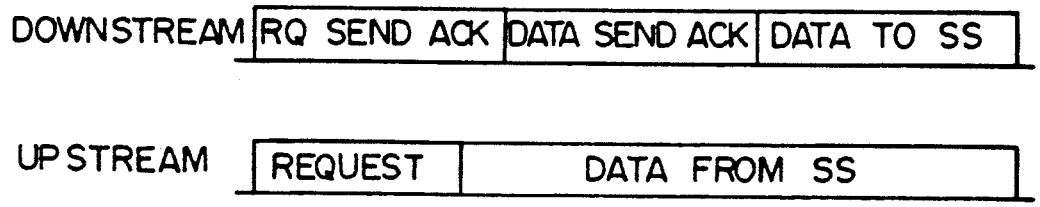
FIG. 4 shows the basic set of formats of the transmission frame on the downstream line 4, and the transmission frame on the upstream line 3, according to the present invention.

FIG. 4 shows the basic formats of the transmission frame on the downstream line 4, and the transmission frame on the upstream line 3, according to the present invention. The transmission frame on the downstream line 4 is sent out from the master station 1, and the transmission frame on the upstream line 3 is constituted by signals which are sent out from one or more slave stations as explained below.

In FIG. 4, RQ SEND ACK denotes a signal which gives an allowance to send a request for sending data, to one of the plurality of slave stations $2_1, 2_2, \ldots 2_n$. data sending ACK denotes a signal which gives an allowance to send data, to one of the plurality of slave stations, DATA TO SS denotes a data which is to be transmitted to one of the slave stations, REQUEST denotes a request for sending data, which is output from one of the slave stations which is addressed by the above signal RQ SEND ACK, and DATA FROM SS denotes a data which is to be transmitted from one of the slave stations toward the master station 1.

The above signal RQ SEND ACK includes information which enables discrimination of a slave station to which the above allowance to send a request is to be given, the above signal data sending ACK includes information which enables discrimination of a slave station to which the above allowance to send data is to be given, and the above signal REQUEST may or may not include information which enables discrimination of a slave station from which the signal is output, as explained later. All the above information is, for example, the address of the slave station. The data DATA TO SS and the data DATA FROM SS are each the same as the corresponding format shown in FIG. 3.

All the embodiments of the present invention which will be explained hereinafter, are described with the arrangement similar to the arrangement shown in FIG. 1. However, the scope of the present invention is not limited to the arrangement shown in FIG. 1, and the techniques which realize the various embodiments of the present invention, can be applied to the general construction comprising a master station and a plurality of slave stations as shown in FIG. 2.

(2) First Embodiment

Figure 1:
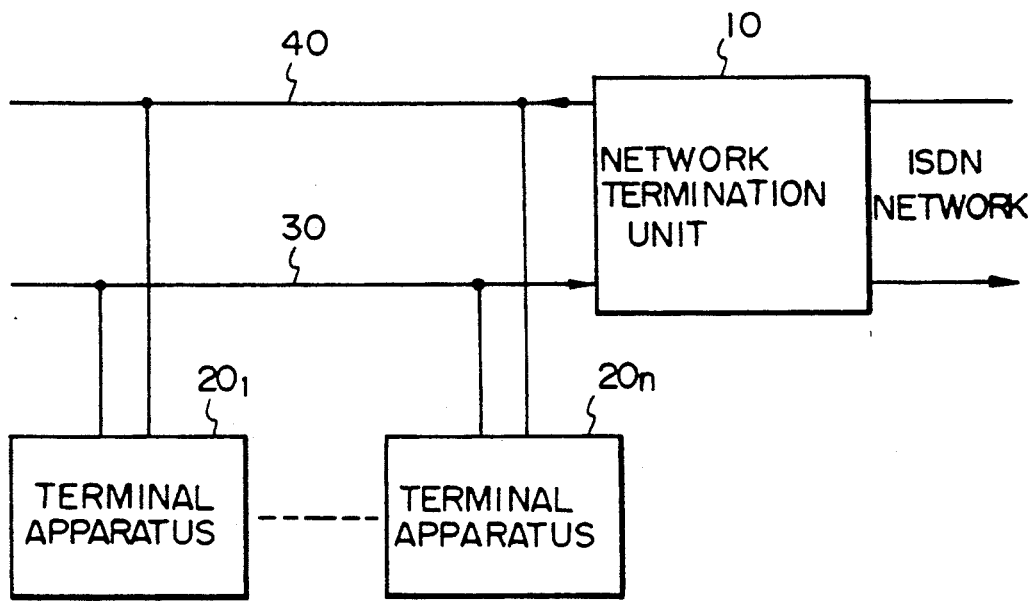
FIG. 1 shows an example of arrangement of a B-ISDN terminal system which is connected with an ISDN network and contains a plurality of terminal apparatuses.
Figure 2:
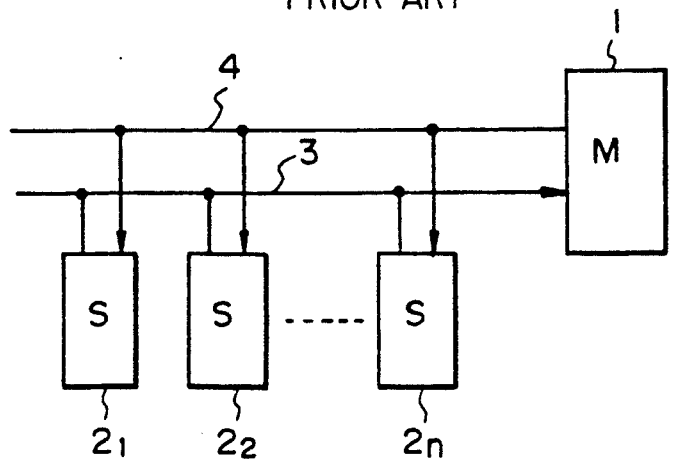
FIG. 2 shows an arrangement of a communication system between a master station and a plurality of slave stations.
Figure 3:
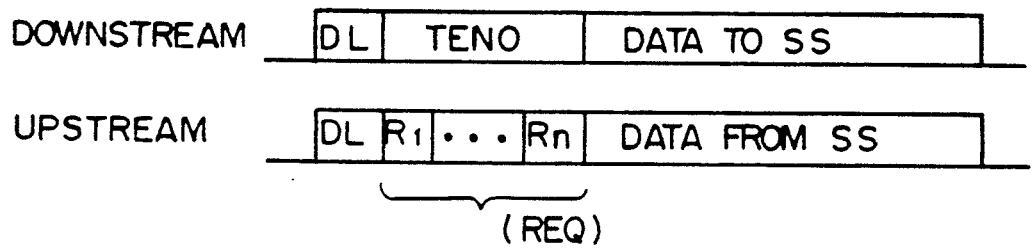
FIG. 3 shows a set of formats of transmission frames in the prior art.
Figure 5:
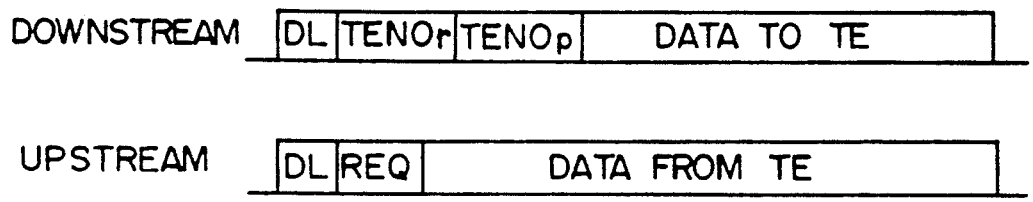
FIG. 5 shows a set of formats of the transmission frames which are used in the first embodiment of the present invention.

FIG. 5 shows a set of formats of the transmission frames of FIG. 3, which is applicable to a B-ISDN terminal system as shown in FIG. 1, and is used in the first embodiment of the present invention.

In the format of FIG. 5, TENOr denotes a terminal number to which terminal apparatus an allowance to send a request for sending data is to be given, and which corresponds to RQ SEND ACK in the format of FIG. 4. Reference TENOr denotes a terminal number to which terminal apparatus an allowance to send data is to be given, and which corresponds to data sending ACK in the format of FIG. 4. Reference DATA TO TE denotes data which is to be transmitted to one of the terminal apparatuses, REQ denotes a request for sending data, which is output from one of the terminal apparatuses, and DATA FROM TE denotes data which is to be transmitted from one of the terminal apparatuses toward the network termination unit 10.

The above signal REQ is comprised of one bit. Each terminal apparatus inserts "1" in the timing of the bit REQ in a transmission frame after the terminal apparatus receives the above signal TENOr which is equal to the terminal number of the terminal apparatus when the terminal apparatus has a request for sending data, or each terminal apparatus inserts "0" in the timing of the bit REQ in a transmission frame after the terminal apparatus receives the above signal TENOr which is equal to the terminal number of the terminal apparatus when the terminal apparatus does not have a request for sending data.

Figure 6:
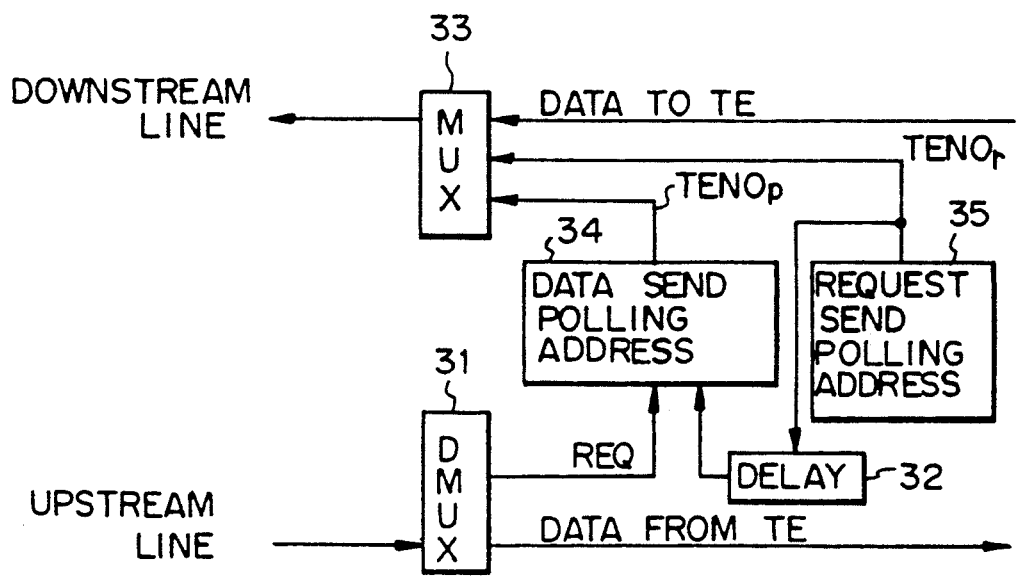
FIG. 6 shows a construction of the network termination unit 10 in the first embodiment of the present invention.

FIG. 6 shows a construction of the network termination unit 10 in the first embodiment of the present invention.

In FIG. 6 reference numeral 31 denotes a demultiplexer, 32 denotes a delay circuit, 33 denotes a multiplexer, 34 denotes a data sending polling address generating circuit, and 35 denotes a request sending polling address generating circuit.

The demultiplexer 31 demultiplexes the above-mentioned transmission frame which has been received from the upstream line 30 into a request bit REQ from one of the terminal apparatuses, and a data signal DATA FROM TE from one of the terminal apparatuses. The data DATA FROM TE is processed in the other portion of the network termination unit 10 as mentioned before, and the request bit REQ is supplied to the data sending polling address generating circuit 34.

Figure 7:
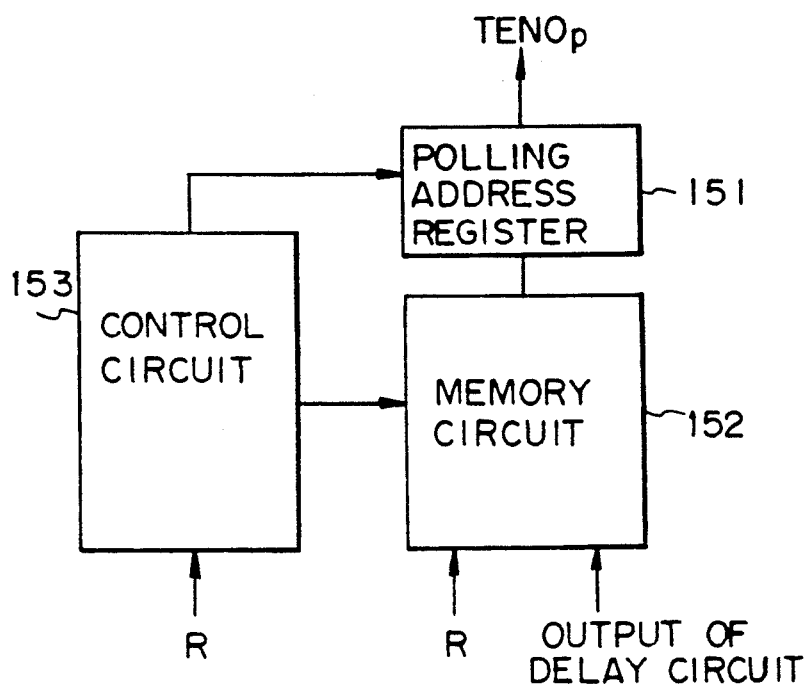
FIG. 7 shows an example of the construction of the data sending polling address generating circuit 34 in FIG. 6.

FIG. 7 shows an example of the construction of the data sending polling address generating circuit 34 in FIG. 6.

In FIG. 7, reference numeral 151 denotes a polling address register, 152 denotes a memory circuit, and 153 denotes a control circuit.

The request sending polling address generating circuit 35 may be realized by a counter. When the request sending polling address generating circuit 35 is constituted by a counter, the counter cyclically outputs one of the terminal numbers of the plurality of terminal apparatuses $20_1, 20_2, \ldots 20_{n-1}, 20_n$ as the above signal TENOr for each cycle in which cycle the network termination unit 10 outputs a transmission frame as shown in FIG. 5, on the downstream line 40.

The memory circuit 152 in the data sending polling address generating circuit 34 memorizes one or more requests for sending data from one or more of the plurality of terminal apparatuses $20_0, 20_1, 20_2, \ldots 20_n$, which have been received from the transmission frames on the upstream line 30 as shown in FIG. 5.

The memory circuit 152 can be constituted by a RAM having addresses corresponding to the plurality of terminal apparatuses $20_0, 20_1, 20_2, \ldots 20_n$, or by a FIFO memory. In the construction where the memory circuit 152 is constituted by a RAM, when the network termination unit 10 received a request for sending data from one of the terminal apparatuses, i.e., when a request bit REQ in a transmission frame which has been received from the upstream line 30 is "1", the request bit "1" is written in the address corresponding to the terminal apparatus in the memory circuit 152.

The address signal to the memory circuit 152 in the above writing operation is given from the output of the delay circuit 32. The delay time in the delay circuit 32 is preset to be equal to a round trip delay in the communication system between the network termination unit 10 and the plurality of terminal apparatuses $20_0, 20_1, 20_2, \ldots 20_n$. It is assumed in the first embodiment, that a sum of the time it takes to transmit a signal from the network termination unit 10 through the downstream line 40 to any one of the plurality of terminal apparatuses $20_0, 20_1, 20_2, \ldots 20_n$, the time it takes for the terminal apparatus to receive the signal from the downstream line 40 and send out a corresponding signal to the upstream line 30, and the time it takes to transmit the signal from the terminal apparatus through the upstream line 30 to the network termination unit 10, is preset to a constant value. This constant value is the round trip delay. The response times in all the terminal apparatus $20_0, 20_1, 20_2, \ldots 20_n$, i.e., the delay times in the terminal apparatuses from the moment receiving the signal from the downstream line 40 to the moment sending out a corresponding signal to the upstream line 30, are respectively preset (adjusted) so that the round trip delays (the above sums of the times) for all the terminal apparatuses are equal.

In the construction where the memory circuit 152 is constituted by a RAM, the control circuit 153 points to one of the addresses wherein a request bit "1" is memorized, and sets a corresponding terminal number in the polling address register 151, for each cycle of sending a transmission frame on the downstream line 40. The order of the above address pointing is predetermined, e.g., as a cyclic order. The bit "1" is reset to "0" when the corresponding terminal number is set in the polling address register 151. The output of the polling address register 151 is sent out through the multiplexer 33 to the downstream line 40 as the above-mentioned TENOp signal.

In the construction where the memory circuit 152 is constituted by a FIFO memory, when the network termination unit 10 receives a request for sending data from one of the terminal apparatuses, i.e., when a request bit REQ in a transmission frame which has been received from the upstream line 30 is "1", the corresponding terminal number which is supplied from the request sending polling address generating circuit 35 through the delay circuit 32, is written in the FIFO memory. On the other hand, the oldest terminal number memorized in the FIFO memory is set in the polling address register 151 for each cycle of sending a transmission frame on the downstream line 40.

The multiplexer 33 in FIG. 6 multiplexes the aforementioned data DATA TO TE, the above-mentioned TENOp from the data sending polling address generating circuit 34, and the above-mentioned TENOr from the request sending polling address generating circuit 35, to a transmission frame as shown in FIG. 5, and the transmission frame is sent out on the downstream line 40.

Figure 8:
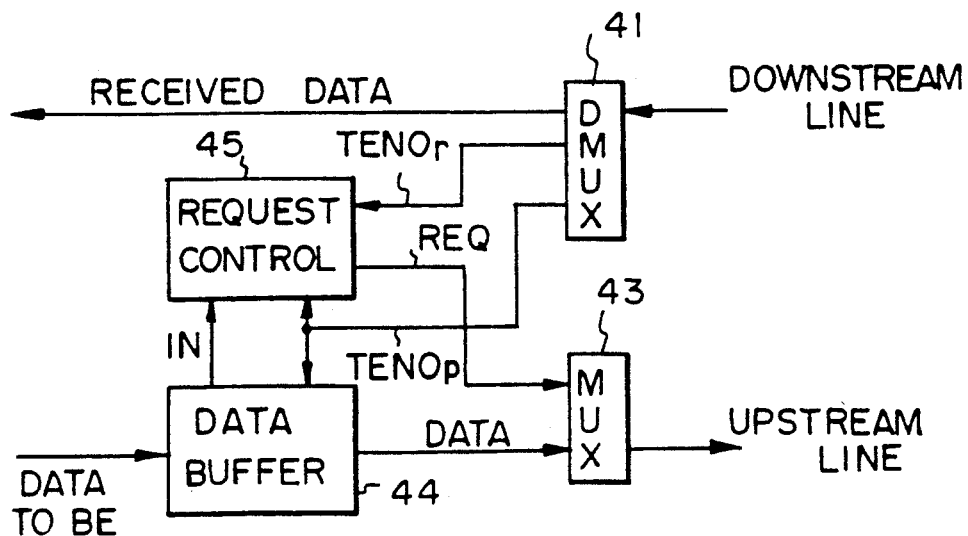
FIG. 8 shows a construction of each terminal apparatus in the first embodiment of the present invention.

FIG. 8 shows a construction of each terminal apparatus in the first embodiment of the present invention.

In FIG. 8, reference numeral 41 denotes a demultiplexer, 43 denotes a multiplexer, 44 denotes a data buffer memory circuit, and 45 denotes a request control circuit.

The demultiplexer 41 demultiplexes the above-mentioned transmission frame which has been received from the downstream line 40 into a signal TENOr, a signal TENOp, and a data signal DATA TO TE from the network termination unit 10. The data DATA TO TE is processed in the other portion (not shown) of the terminal apparatus. As mentioned before, the data DATA TO TE includes a terminal number to which terminal the data DATA TO TE is addressed. Although not shown, each terminal apparatus has a function to determine whether or not the received data DATA TO TE is addressed to its own terminal apparatus.

The data buffer memory circuit 44 comprises a FIFO memory, and the FIFO memory outputs a signal IN which indicates a quantity of data contained in its own memory. Although not shown, the data buffer memory circuit 44 further comprises an output control circuit. The output control circuit determines whether or not the received TENOp is equal to its own terminal number. When it is determined that the received TENOp is equal to its own terminal number, and the above signal IN indicates that the FIFO memory contains data which is to be sent to the network termination unit 10, the output control circuit controls the FIFO memory to output the oldest data contained in the memory.

The signal received TENOr is supplied to the request control circuit 45. The request control circuit 45 determines whether or not the received TENOr is equal to its own terminal number, and whether or not the data buffer memory circuit 44 contains data which is to be sent to the network termination unit 10. When both the signals TENOr and TENOp address its own terminal apparatus, the determination on the data in the data buffer memory circuit 44 is carried out regarding whether or not the data buffer memory circuit 44 still contains data which is to be sent even after the data is output corresponding to the signal TENOp.

When it is determined that the received TENOr is equal to its own terminal number, the request control circuit 45 outputs "1." as a request bit REQ when the data buffer memory circuit 44 contains data which is to be sent to the network termination unit 10, or outputs "0" as a request bit REQ when the data buffer memory circuit 44 does not contain data which is to be sent to the network termination unit 10. The signal IN is supplied to the above request control circuit 45. Thus, the request control circuit 45 carries out the above determination on the data in the data buffer memory circuit 44 based on the signal IN.

The multiplexer 43 inserts the above request bit REQ in a transmission frame as shown in FIG. 5, which is transmitted on the upstream line 30, when the received signal TENOr addresses its own terminal number, and the multiplexer 43 inserts the above output data DATA in a transmission frame as shown in FIG. 5, which is transmitted on the upstream line 30, when the received signal TENOp addresses its own terminal number.

(3) Second Embodiment

Figure 9:
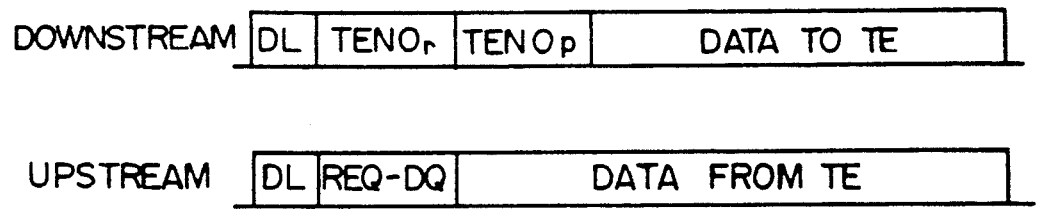
FIG. 9 shows a second set of formats of the transmission frames, which are used in the second embodiment of the present invention.

FIG. 9 shows a second set of formats of the transmission frames, which are transmitted between a network termination unit and terminal apparatuses in a B-ISDN terminal system and are used in the second embodiment of the present invention. The second embodiment is also applicable to the B-ISDN terminal system having the basic configuration shown in FIG. 1.

The only difference of the formats of FIG. 9 from the formats of FIG. 5 is that a signal REQ-DQ which indicates a quantity of data which is held in a terminal apparatus, instead of a request bit REQ, is contained in the transmission frame transmitted on the upstream line 30.

Figure 10:
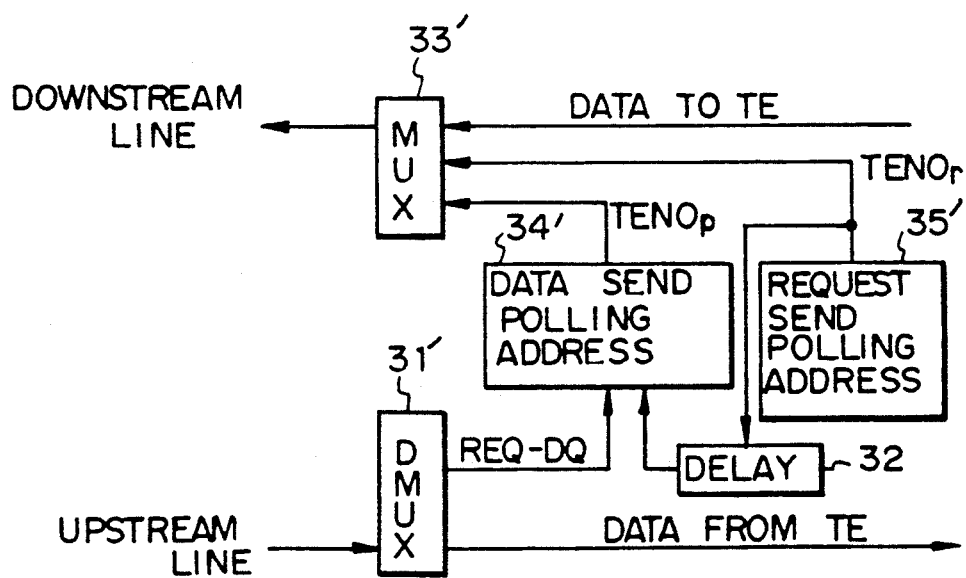
FIG. 10 shows a construction of the network termination unit 10 in the second embodiment of the present invention.
Figure 11:
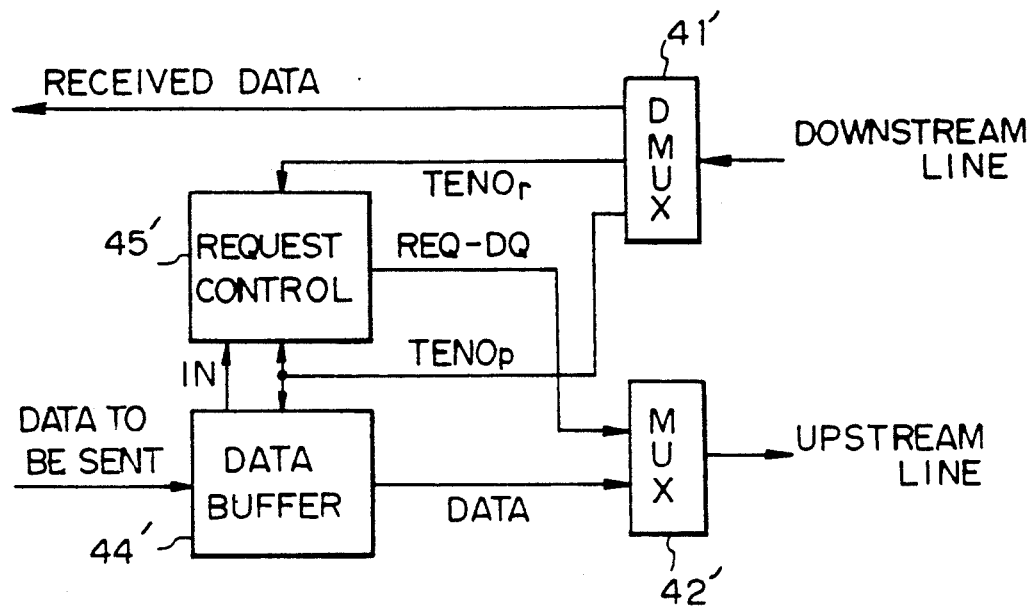
FIG. 11 shows a construction of each terminal apparatus in the second embodiment of the present invention.

FIG. 10 shows a construction of the network termination unit 10 :n the second embodiment of the present invention, and FIG. 11 shows a construction of each terminal apparatus in the second embodiment of the present invention.

The constructions of the network termination unit 10 and each of the terminal apparatuses in the second embodiment of the present invention are the same as the constructions of FIG. 6 and 8, respectively, except as explained below.

The components in FIGS. 10 and 11 having the same reference numerals as FIGS. 6 and 8, with an added prime ', each function basically the same as the corresponding component in FIGS. 6 and 8, except as explained below.

In the second embodiment of the present invention, the demultiplexer 31' in FIG. 10 demultiplexes the above-mentioned transmission frame which has been received from the upstream line 30, into a signal REQ. DQ, and a data signal DATA FROM TE from one of the terminal apparatuses. The signal REQ-DQ is supplied to the data sending polling address generating circuit 34'.

The data sending polling address generating circuit 34'in FIG. 10 has a construction, for example, similar to the construction of FIG. 7, except that a signal REQ-DQ instead of a REQ signal, is input in the data sending polling address generating circuit 34', and the operation of the control circuit 153 is different from the first embodiment as explained later.

The memory circuit 152 in the data sending polling address generating circuit 34' memorizes one or more requests for sending data from one or more of the plurality of terminal apparatuses $20_0$, $20_1$, $20_2$, . . . $20_n$, which have been received from the transmission frames on the upstream line 30 as shown in FIG. 9, in the form of their requested quantities of data to sent.

In the construction where the memory circuit 152 is constituted by a RAM, when the network termination unit 10 receives a signal REQ-DQ indicating a request for sending data from one of the terminal apparatuses, i.e., when a signal REQ-DQ in a transmission frame which has been received from the upstream line 30 is not "0", the quantity indicated by the signal REQ-DQ is written in the address corresponding to the terminal apparatus in the memory circuit 152.

The address signal to the memory circuit 152 in the above writing operation is given from the output of the delay circuit 32'. The delay time in the delay circuit 32' is preset similarly to the first embodiment.

In the construction where the memory circuit 152 is constituted by a FIFO memory, when the network termination unit 10 receives a signal REQ-DQ indicating a request for sending data from one of the terminal apparatuses, i.e., when a signal REQ-DQ in a transmission frame which has been received from the upstream line 30 is not "0", the quantity indicated by the signal REQ-DQ is written in the FIFO memory together with the corresponding terminal number which is supplied from the request sending polling address generating circuit 35' through the delay circuit 32'.

In the construction where the memory circuit 152 is constituted by a RAM, the control circuit 153 points to one of the addresses wherein the above-mentioned (non-zero) quantity is memorized, sets a corresponding terminal number in the polling address register 151, and reads the quantity. Then, the control circuit 153 decreases the held quantity by an amount corresponding to a quantity of data which is transmitted by a transmission frame, for each cycle of sending a transmission frame on the downstream line 40.

The content of the polling address register 151 is not changed for one or more cycles until the above quantity in the control circuit 153 becomes zero. The content of the address is reset to "null" when the above quantity in the control circuit 153 becomes zero, and the control circuit 153 points to another address wherein the above-mentioned (non-zero) quantity is memorized, and repeats the above operation. The order of the above address pointing is predetermined, e.g., as a cyclic order.

The output of the polling address register 151 is sent out through the multiplexer 33' to the downstream line 40 as the above-mentioned TENOp signal.

In the construction where the memory circuit 152 is constituted by a FIFO memory, an oldest set of a terminal number and an accompanying quantity which are memorized in the FIFO memory, are read out. The terminal number is set in the polling address register 151, and the quantity is held in the control circuit 153. The operation after this, is similar to above operation in the construction where the memory circuit 152 is constituted by a RAM, except that the reset operation of the memory circuit 152 is unnecessary.

The operation of the multiplexer 33' in FIG. 10 is the same as the operation of the multiplexer 33 in FIG. 6. Thus, the network termination unit 10 can give allowances to send data to each terminal apparatus according to the quantity of data which is requested to be sent.

The terminal apparatus of FIG. 11 in the second embodiment of the present invention, is different from the terminal apparatus of FIG. 8 only in the operation of the request control circuit 45'. The request control circuit 45' determines whether or not the received TENOr is equal to its own terminal number, and whether or not the data buffer memory circuit 44' contains data which is to be sent to the network termination unit 10. When both the signals TENOr and TENOp addresses its own terminal apparatus, the determination on the data in the data buffer memory circuit 44' is carried out regarding whether or not the data buffer memory circuit 44 contains data which is to be sent even after the data is output corresponding to the signal TENOp.

When it is determined that the received TENOr is equal to its own terminal number, the request control circuit 45' outputs a signal REQ-DQ which indicates the quantity of data held in the data buffer memory circuit. The signal REQ-DQ is output based on the signal IN which is supplied from the data buffer memory circuit 44'. As explained before, the signal IN indicates a quantity of data contained in its own memory, and is supplied to the above request control circuit 45'.

The multiplexer 43' inserts the above signal REQ DQ in a transmission frame as shown in FIG. 9, which is transmitted on the upstream line 30, when the received signal TENOr addresses its own terminal number, and the multiplexer 43' inserts the above output data DATA in a transmission frame as shown in FIG. 9, which is transmitted on the upstream line 30, when the received signal TENOp addresses its own terminal number.

(4) Third Embodiment

However, in the second embodiment of the present invention, when the round trip delay is large, the information on the above data quantity REQ-DQ which is memorized in each address is different from the quantity of data which is actually held in a terminal apparatus at the moment, because one or more allowances to send data may have been sent out from the network termination unit 10 after the memorized data quantity is sent out from a corresponding terminal apparatus. The difference is caused by, and therefore, depends on a time from the moment a terminal apparatus sends a data quantity REQ-DQ to the moment the data quantity REQ-DQ is received in the network termination unit 10.

Therefore, it is desirable to correct the memorized data quantity in the network termination unit 10 according to a history of TENOp signals which have been output from the network termination unit 10 in a preceding time, where the length of the time is equal to the above time from the moment a terminal apparatus sends a data quantity REQ-DQ to the moment the data quantity REQ-DQ is received in the network termination unit 10, when an allowance to send data is sent out from the network termination unit 10. If the above correction is not made, one or more allowances to send data can be sent out from the network termination unit 10 based on the old quantity data, even after the quantity of data which is actually held in a terminal apparatus has become zero. The third embodiment of the present invention is provided for carrying out the above correction in the construction of the second embodiment of the present invention.

Although not shown, in the third embodiment, the network termination unit 10 further memorizes a number of operations of sending each terminal number as a TENOp signal in a predetermined time. The predetermined time corresponds to the above time from the moment a terminal apparatus sends a data quantity REQ-DQ to the moment the data quantity REQ-DQ is received in the network termination unit 10. When a packet $P_1$ containing a terminal number TENOp is sent out periodically from the network termination unit 10, the above memorizing operation of a number of operations of sending each terminal number as a TENOp signal in a predetermined time, is carried out, for example, by memorizing terminal numbers which have been sent out for a predetermined number of preceding cycles of sending TENOp signals from the network termination unit 10. The predetermined number of cycles corresponds to the above-mentioned predetermined time. Namely, a number of operations of sending each terminal number as a TENOp signal in a predetermined time, can be counted in the history of operations in the predetermined number of preceding cycles of sending TENOp signals from the network termination unit 10. The memory memorizing the above history is referred to as a history memory below.

FIG. 12 shows an operation for carrying out the above-mentioned correction of the memorized data quantity in the network termination unit 10 according to the time from the moment a terminal apparatus sends a data quantity REQ-DQ to the moment the data quantity REQ-DQ is received in the network termination unit 10, when an allowance to send data is sent out from the network termination unit 10. The operation of FIG. 12 can be carried out together with the operation of the second embodiment of the present invention.

In the step 731 of FIG. 12, a TENOp signal is output on the downstream line 40 from the network termination unit 10 using a packet $P_1$, according to the described procedure of the second embodiment of the present invention.

In the step 732, the oldest terminal number TENOp which is memorized in the above-mentioned history memory is eliminated from the history memory, and the new terminal number TENOp which is output in the step 731 is written in the history memory.

The step 733 shows a step for receiving new data quantity information REQ-DQ. When new data quantity information REQ-DQ is received in the step 733, the number of the terminal numbers TENOp which are memorized in the history memory, and correspond to a terminal apparatus from which the new data quantity information REQ-DQ is received, is obtained from the content of the history memory, in the step 734.

In the step 735, the received data quantity REQ-DQ is corrected in accordance with the equation as shown in the step 735 of FIG. 12. The above operation is carried out before the received new data quantity information REQ-DQ is written in the memory circuit 152 of FIG. 7 in the second embodiment of the present invention.

The above operation of FIG. 12 can be applied to all the other embodiments of the present invention wherein quantities of data in terminal apparatuses are sent to the network termination unit 10, and the network termination unit 10 carries out polling operations in accordance with the information on the quantities of data in terminal apparatuses.

(5) Fourth Embodiment

Figure 13:
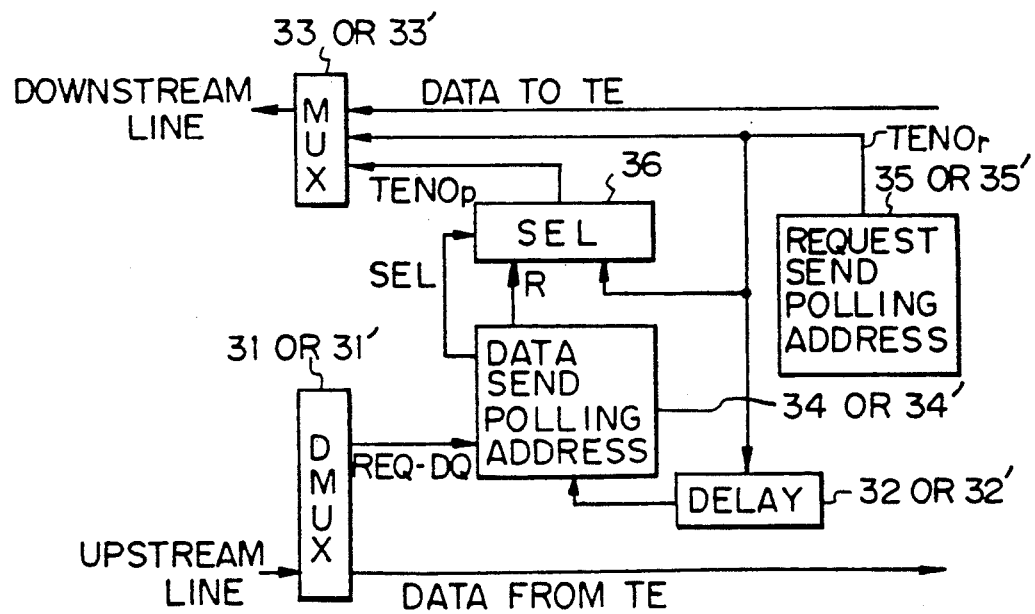
FIG. 13 shows the construction of the network termination unit 10 in the fourth embodiment of the present invention.

FIG. 13 shows the construction of the network termination unit 10 in the fourth embodiment of the present invention.

The fourth embodiment provides a modification of the construction of the network termination unit 10 in the first and second embodiments as explained below.

The only difference in the network termination unit 10 in the fourth embodiment is that a selector 36 is provided at the stage after the data sending polling address generating circuit 34 or 34'. The selector 32 receives both the outputs of the data sending polling address generating circuit 34 or 34' and the request sending polling address generating circuit 35 or 35'. The selector 36 selects the output of the data sending polling address generating circuit 34 or 34' when the memory circuit 152 contains a request from a terminal apparatus, or selects the output of the request sending polling address generating circuit 35 or 35' when the memory circuit 152 contains no request from the plurality of terminal apparatuses $20_0, 20_1, 20_2, \ldots 20_n$. The selection is controlled by the control circuit 153.

According to the construction of the fourth embodiment, a signal TENOp which allows a terminal apparatus to send data is given to the same terminal apparatus to which a signal TENOr is given when no request for sending data is memorized in the network termination unit 10, and therefore, a terminal apparatus wherein a new request for sending data has occurred can immediately send the data when the terminal apparatus is addressed by the signals TENOp and TENOr.

(6) Fifth Embodiment

Figure 14:
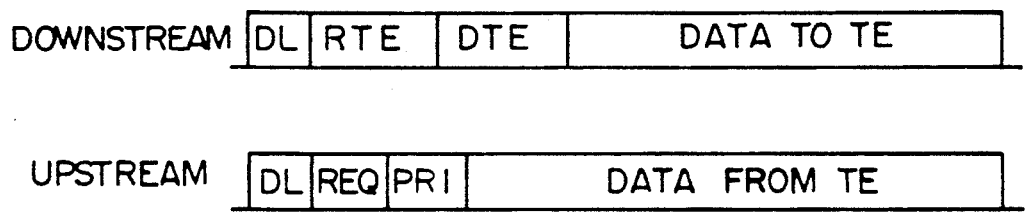
FIG. 14 shows a third set of the formats of the transmission frames, which are used in the fifth embodiment of the present invention.

FIG. 14 shows a third set of formats of the transmission frames, which are transmitted between the network termination unit 10 and the terminal apparatuses $20_0, 20_1, 20_2, \ldots 20_n$ in a B-ISDN terminal system as shown in FIG. 1, and are used in the fifth embodiment of the present invention.

The only difference of the formats of FIG. 14 from the formats of FIG. 5 is that a priority bit PRI is further contained in the transmission frame transmitted on the upstream line 30. The request bit REQ functions the same as in the first embodiment of the present invention, and the priority bit PRI indicates a priority level of the terminal apparatus which outputs the request bit REQ, when a priority level is preassigned for each terminal apparatus, and the priority bit PRI is inserted after the corresponding request bit REQ, as shown in FIG. 14.

Figure 15:
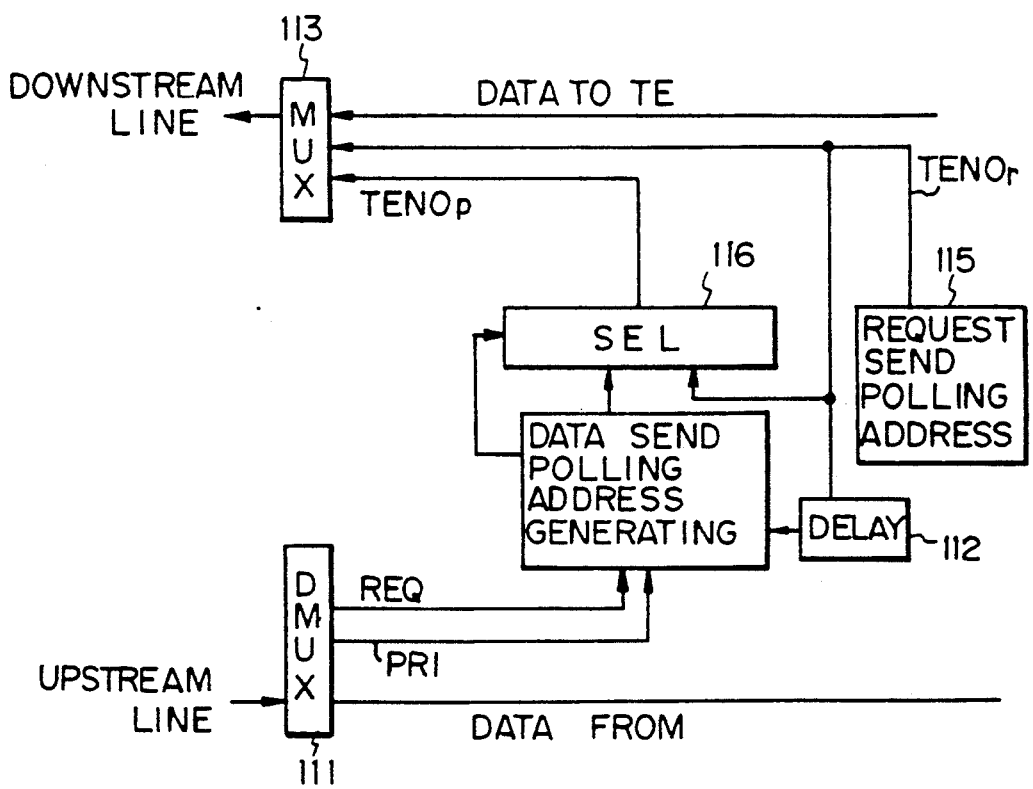
FIG. 15 shows a construction of the network termination unit 10 in the fifth embodiment of the present invention.
Figure 16:
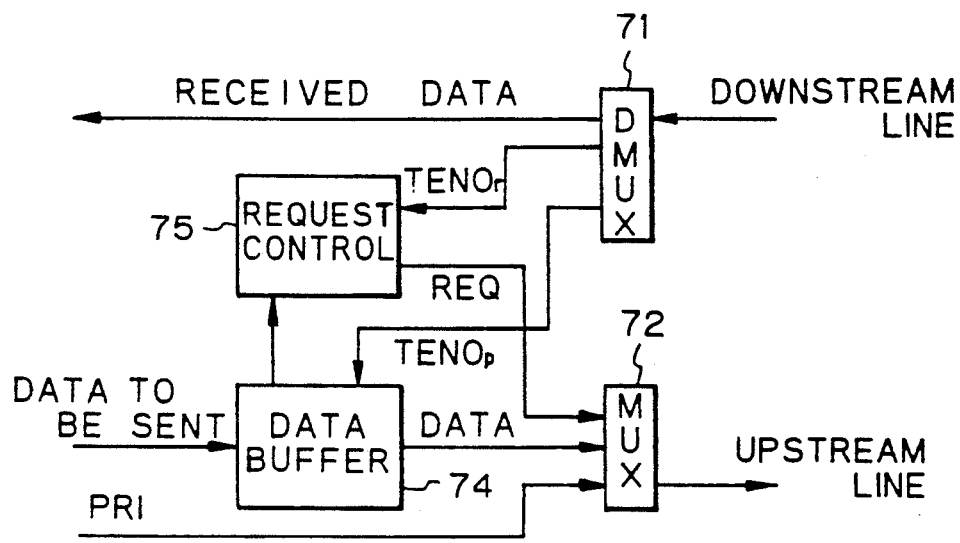
FIG. 16 shows a construction of each terminal apparatus in the fifth embodiment of the present invention.

FIG. 15 shows a construction of the network termination unit 10 in the fifth embodiment of the present invention, and FIG. 16 shows a construction of each terminal apparatus in the fifth embodiment of the present invention.

The constructions of the network termination unit 10 and each of the terminal apparatuses in the fifth embodiment of the present invention are the same as the constructions of FIG. 6 and 8, respectively, except as explained below.

The components in FIGS. 15 and 16 each function basically the same as the corresponding component in FIGS. 6, 8 and 13, except as explained below.

In the fifth embodiment of the present invention, the demultiplexer 111 in FIG. 15 demultiplexes the above-mentioned transmission frame which has been received from the upstream line 30, into a request signal REQ, a priority signal PRI, and a data signal DATA FROM TE from one of the terminal apparatuses. The signals REQ and PRI are supplied to the data sending polling address generating circuit 114.

The data sending polling address generating circuit 114 in FIG. 16 has a construction, for example, similar to the construction of FIG. 7, except that signals REQ and PRI are input in the data sending polling address generating circuit 114, and that the operation of the control circuit 153 is different from the first embodiment as explained later.

The memory circuit 152 in the data sending polling address generating circuit 114 is constituted, for example, by a RAM, and memorizes one or more requests for sending data from one or more of the plurality of terminal apparatuses $20_0$, $20_1$, $20_2$, ... $20_n$, which requests have been received from the transmission frames on the upstream line 30 as shown in FIG. 18.

When the network termination unit 10 receives a signal REQ indicating a request for sending data from one of the terminal apparatuses, i.e., when a signal REQ in a transmission frame which has been received from the upstream line 30 is "1", the corresponding priority level PRI is written in the address corresponding to the terminal apparatus in the memory circuit 152.

The address signal to the memory circuit 152 in the above writing operation is given from the output of the delay circuit 52. The delay time in the delay circuit 52 is preset similarly to the first embodiment.

The control circuit 153 points to one of the addresses among one or more addresses wherein a highest priority level PRI is memorized, and sets a corresponding terminal number in the polling address register 151, for each cycle of sending a transmission frame on the downstream line 40. The order of the above address pointing among the addresses of the same priority level, is predetermined, e.g., as a cyclic order. The content of the address is reset to "0" when the corresponding terminal number is set in the polling address register 151. The output of the polling address register 151 is sent out through the multiplexer 113 to the downstream line 40 as the above-mentioned TENOp signal.

The selector 116 in FIG. 15 functions the same as the selector 36 in FIG. 13. Namely, the network termination unit 10 of FIG. 15 functions the same as the fourth embodiment regarding the outputting of the signal TENOp. Otherwise, when the selector 116 in FIG. 15 is deleted, the network termination unit 10 of FIG. 15 functions the same as the first embodiment regarding the outputting of the signal TENOp.

FIG. 16 shows a construction of each terminal apparatus in the fifth embodiment of the present invention.

The demultiplexer 71 and the data buffer memory circuit 74 each function the same as the corresponding component in the first embodiment of the present invention. Namely, the demultiplexer 71 demultiplexes a transmission frame of a format shown in FIG. 14 into a signal TENOr, and a signal TENOp, and a data signal DATA TO TE, and the data buffer memory circuit 74 comprises a FIFO memory and an output control circuit, as explained before.

The output control circuit determines whether or not the received TENOp is equal to its own terminal number. When it is determined that the received TENOp is equal to its own terminal number, and the aforementioned signal IN indicates that the FIFO memory contains data which is to be sent to the network termination unit 10, the output control circuit controls the FIFO memory to output the oldest data contained in the memory.

The signal received TENOr is supplied to the request control circuit 75. The request control circuit 75 determines whether or not the received TENOr is equal to its own terminal number, and whether or not the data buffer memory circuit 74 contains data which is to be sent to the network termination unit 10.

The request control circuit 75 determines whether or not the received TENOr is equal to its own terminal number, and whether or not the data buffer memory circuit 74 contains data which is to be sent to the network termination unit 10. When both the signals TENOp and TENOr address its own terminal apparatus, the determination on the data in the data buffer memory circuit 74 is carried out regarding whether or not the data buffer memory circuit 74 contains data which is to be sent, even after the data is output corresponding to the signal TENOp.

When it is determined that the received TENOr is equal to its own terminal number, the request control circuit 75 outputs "1" as a first request bit R1 when the data buffer memory circuit 74 contains data which is to be sent to the network termination unit 10, or outputs "0" as a request bit REQ when the data buffer memory circuit 74 does not contain data which is to be sent to the network termination unit 10.

The priority level PRI is assigned for each terminal apparatus in advance, and, although not shown, each terminal apparatus holds the value of the priority level PRI.

The multiplexer 73 inserts the above request bit REQ and the priority signal PRI in a transmission frame as shown in FIG. 14, which is transmitted on the upstream line 30, when the received signal TENOr addresses its own terminal number, and the multiplexer 73 inserts the output data DATA in a transmission frame as shown in FIG. 14, which is transmitted on the upstream line 30, when the received signal TENOp addresses its own terminal number.

Figure 17:
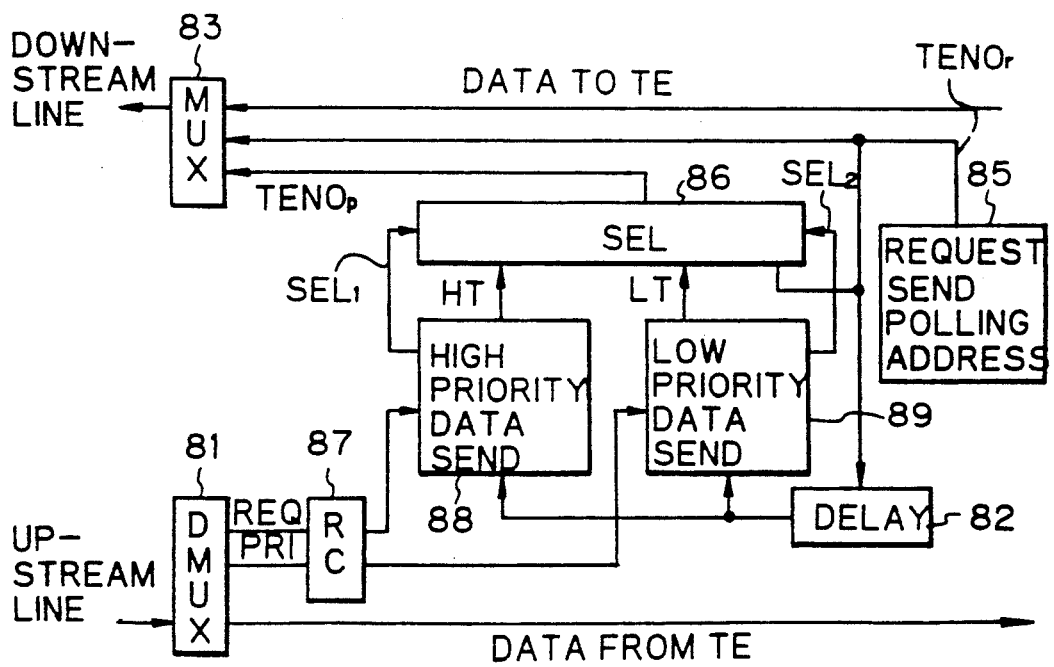
FIG. 17 shows another construction of the network termination unit 10 in the fifth embodiment of the present invention.

FIG. 17 shows another construction of the network termination unit 10 in the fifth embodiment of the present invention.

In the construction of FIG. 17, the demultiplexer 81, the delay circuit 82, the multiplexer 83, and the request sending polling address generating circuit 85 each function the same as the corresponding component in the construction of FIG. 15. The data sending polling address generating circuits 88 and 89 are provided for respective priority levels, for example, the high priority and the low priority. Each of the high priority data sending polling address generating circuit 88 and the low priority data sending polling address generating circuit 89 can be constituted by a FIFO memory. The request signal REQ and the priority signal PRI which are output from the demultiplexer 81, are input into a decoder 87, and the decoder 87 has two output bits RH and RL. When the request bit REQ is "1", and the priority signal PRI is in "1" (high priority level), the two output bits (RH, RL) of the decoder 87 are (1, 0), or when the request bit REQ is "1", and the priority signal PRI is in "0" (low priority level), the two output bits (RH, RL) of the decoder 87 are (0, 1).

The output bit RH is supplied to the high priority data sending polling address generating circuit 88 as an input control signal, and the output bit RL is supplied to the low priority data sending polling address generating circuit 89 as an input control signal. The output of the delay circuit 82 is applied to both the high priority and low priority data sending polling address generating circuits 88 and 89. Thus, the output of the delay circuit 82 is input into the high priority data sending polling address generating circuit 88 when the request bit REQ is "1", and the priority signal PRI is in "1" (high priority level), or the output of the delay circuit 82 is input into the low priority data sending polling address generating circuit 89 when the request bit REQ is "1", and the priority signal PRI is in "0" (low priority level).

Although not shown, a control circuit is provided for the high priority and low priority data sending polling address generating circuits 88 and 89, and the control circuit controls the outputs of the high priority and low priority data sending polling address generating circuits 88 and 89. The control circuit controls the high priority data sending polling address generating circuit 88 to output an oldest terminal number for each cycle of sending a transmission frame on the downstream line 40 as long as the high priority data sending polling address generating circuit 88 contains at least one terminal number. When the high priority data sending polling address generating circuit 88 contains no terminal number, the control circuit controls the low priority data sending polling address generating circuit 89 to output an oldest terminal number for each cycle of sending a transmission frame on the downstream line 40 as long as the low priority data sending polling address generating circuit 89 contains at least one terminal number.

The output selection in the selector 86 is controlled based on the signals SEL1 and SEL2 from the the high priority and low priority data sending polling address generating circuits 88 and 89, respectively indicating whether or not the high priority or low priority data sending polling address generating circuit 88 or 89 contains at least one terminal number. The output of the high priority data sending polling address generating circuit 88 is selected as the output of the selector 86 as long as the high priority data sending polling address generating circuit 88 contains at least one terminal number. When the high priority data sending polling address generating circuit 88 contains no terminal number, the output of the low priority data sending polling address generating circuit 89 is selected as the output of the selector 86 as long as the low priority data sending polling address generating circuit 89 contains at least one terminal number. When both the high priority and low priority data sending polling address generating circuits 88 and 89 contain no terminal number, the output of the request sending polling address generating circuit 85 is selected as the output of the selector 86.

Thus, according to the network termination unit 10 of FIG. 17, the allowances to send data are transmitted to the terminal apparatuses in the order of the priority level PRI, and the order of receiving requests for sending data. Further, as easily understood, if there are more than two priority levels, a data sending polling address generating circuit can be provided for each priority level.

(7) Sixth Embodiment

FIG. 18 shows a fourth set of formats of the transmission frames, which are transmitted between the network termination unit 10 and the terminal apparatuses $20_0$, $20_1$, $20_2$, ... $20_n$ in a B-ISDN terminal system as shown in FIG. 1, and are used in the sixth embodiment of the present invention.

The only difference of the formats of FIG. 18 from the formats of FIG. 5 is that first and second request bits R1 and R2 are contained in the transmission frame transmitted on the upstream line 30. The first request bit R1 functions the same as the request bit REQ in the first embodiment of the present invention, and the second request bit R2 indicates whether or not the data buffer memory circuit (explained later) contains a further data which is requested to be sent, after a predetermined amount of data is output responding to a signal TENOp, and the second request bit R2 is inserted before the top of the data signal which is output from the data buffer memory circuit responding to the signal TENOp, as shown in FIG. 18.

Figure 19:
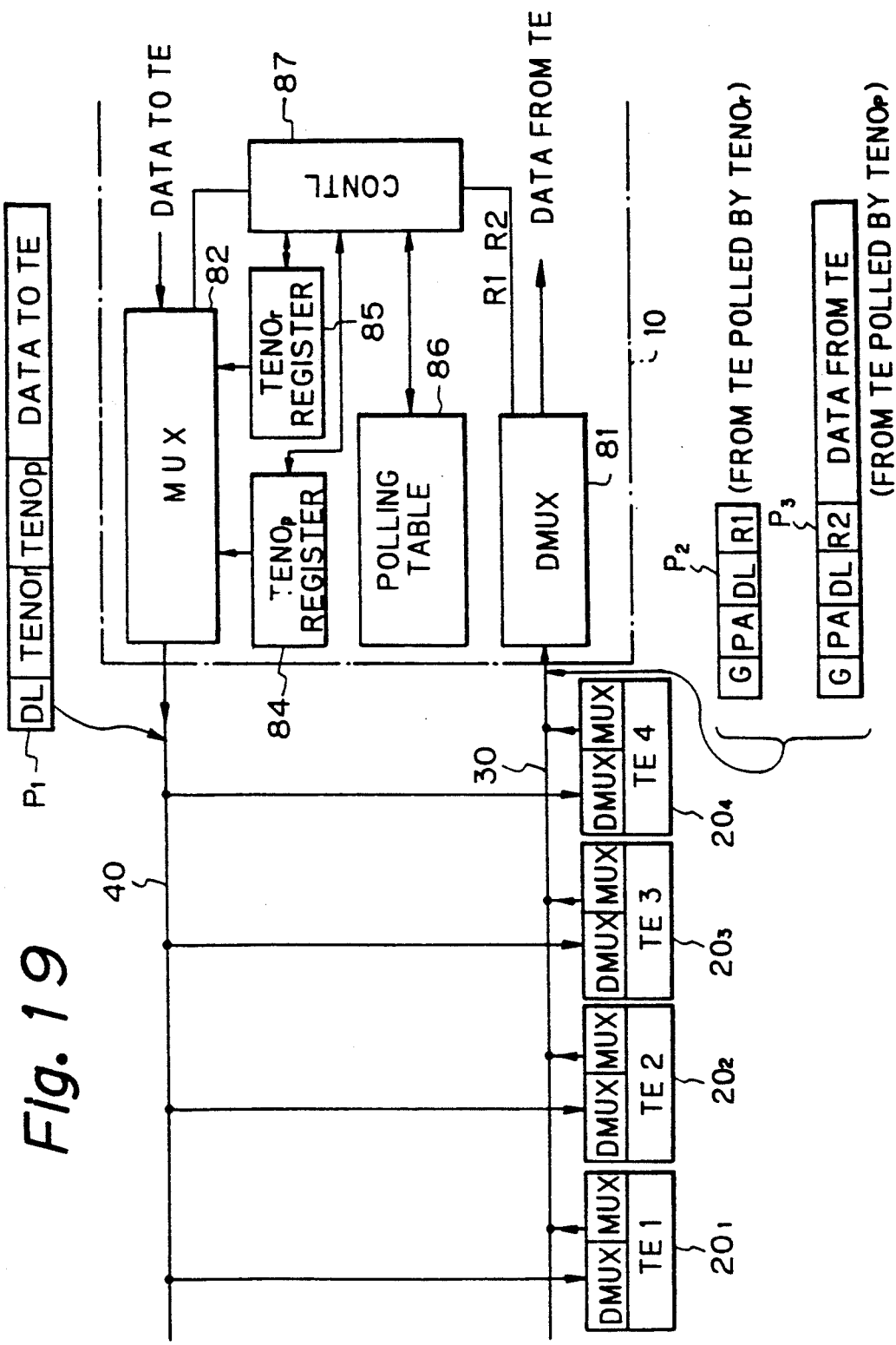
FIG. 19 shows a construction of the network termination unit 10 in the sixth embodiment of the present invention.

FIG. 19 shows a construction of the network termination unit 10 in the sixth embodiment of the present invention, and FIG. 20 shows a construction of each terminal apparatus in the sixth embodiment of the present invention.

The components in FIGS. 19 and 20 each function basically the same as the corresponding component in FIGS. 6, 8 and 13, except as explained below.

In FIG. 19, reference numeral 10 denotes a network termination unit, $20_1$, $20_2$, ... $20_4$ each denote a terminal apparatus, $P_1$ denotes a packet on the downstream line 40, $P_2$ and $P_3$ each denote a packet on the upstream line 30. In the network termination unit 100, reference numeral 81 denotes a demultiplexer, 82 denotes a multiplexer, 84 denotes a TENOp register, 85 denotes a TENOr register, 86 denotes a polling table, and 87 denotes a controller.

The formats of transmission frames transmitted on the upstream line 30 and the downstream line 40 as shown in FIG. 18 are used in the sixth embodiment of the present invention, the construction of each terminal apparatus is the same as the construction of FIG. 20, and therefore, the operation of the sixth embodiment of the present invention, is similar to the aforementioned fifth embodiment of the the present invention, except the control procedure of polling in the network termination unit 100 as explained below.

In FIG. 19, the transmission frame on the upstream line 30 is shown as two packets $P_2$ and $P_3$ because the portion of the transmission frame on the upstream line 30 shown in FIG. 18, which includes the aforementioned first request bit R1, and the other portion of the transmission frame on the upstream line 30 shown in FIG. 18, which includes the aforementioned second request bit R2 and a data signal DATA FROM TE, are independently output from terminal apparatuses which are respectively polled by signals TENOr and TENOp. In each packet, G denotes a guard time which is provided for preventing an interference between signals output from different terminal apparatuses, and PA denotes a preamble for extracting a clock signal from a signal output from each terminal apparatus.

In the sixth embodiment of the present invention, the demultiplexer 51 in FIG. 19 demultiplexes the above-mentioned transmission frame which has been received from the upstream line 30, into a signal R1, a signal R2, and a data signal DATA FROM TE. The signals R1 and R2 output from the demultiplexer 51 are supplied to the controller 87.

The TENOp register 84 holds a TENOp signal, and the TENOr register 85 holds a TENOr signal. Both of which signals are then contained in a packet $P_1$, and the packet $P_1$ is to be transmitted on the downstream line 40.

The polling table 86 memorizes one or more requests from the terminal apparatuses. The polling table 86 is, for example, constituted by a RAM, wherein an address is assigned for each terminal apparatus.

In the construction of FIG. 19, when the network termination unit 10 received either a signal R1 or a signal R2 indicating a request for sending data from one of the terminal apparatuses, i.e., when either a signal R1 or a signal R2 in a transmission frame which has been received from the upstream line 30 is "1", "1" is written in the address corresponding to the terminal apparatus which sends the request bit R1 or R2, in the polling table 86.

The address signal applied to the polling table 86 in the above writing operation, is a TENOp signal or a TENOr signal which is output from the network termination unit 10, according to whether the received request bit "1" is R1 or R2. In the sixth embodiment, it is assumed that the round trip delay is so small that it is negligible, and therefore, the TENOr signal and the TENOp signal which respectively correspond to the received R1 or R2, are still available from the TENOr register 85 and the TENOp register 84, respectively, when the signals R1 and R2 are received.

The controller 87 points to one of the addresses wherein a request bit "1" is memorized, and sets a corresponding terminal number in the TENOp register 84, for each cycle of sending a transmission frame on the downstream line 40. The order of the above address pointing is predetermined, e.g., as a cyclic order. The bit "1" is reset to "0" when the corresponding terminal number is set in the TENOp register 84. The output of the TENOp register 84 is sent out through the multiplexer 33 to the downstream line 40 as the above-mentioned TENOp signal.

In the TENOr register 85, one of the terminal numbers is set for each cycle of sending a transmission frame on the downstream line 40. The TENOr register 85 may be replaced by a counter which cyclically outputs one of the terminal numbers for each cycle of sending a transmission frame on the downstream line 40.

When the polling table does not contain a request bit "1", the controller 87 can set the output value of the TENOr register 85 as a setting value of the TENOp register 84. This operation results in the same effect as the provisions of the selector 36' 116 and 86 in the constructions of FIG. 13, 14, and 16, respectively.

FIG. 20 shows a construction of each terminal apparatus in the sixth embodiment of the present invention.

The demultiplexer 61 and the data buffer memory circuit 64 each function the same as the corresponding component in the first embodiment of the present invention. Namely, the demultiplexer 61 demultiplexes a transmission frame of a format shown in FIG. 18 into a signal TENOr, and a signal TENOp, and a data signal DATA TO TE, and the data buffer memory circuit 64 comprises a FIFO memory and an output control circuit, as explained before.

The output control circuit determines whether or not the received TENOp is equal to its own terminal number. When it is determined that the received TENOp is equal to its own terminal number, and the aforementioned signal IN indicates that the FIFO memory contains data which is to be sent to the network termination unit 10, the output control circuit controls the FIFO memory to output the oldest data contained in the memory.

Further, when a received signal TENOp addresses its own terminal apparatus, the determination on the data in the data buffer memory circuit 64 is carried out regarding whether or not the data buffer memory circuit 64 contains data which is to be sent, even after the data is output corresponding to the signal TENOp. When it is determined that the data buffer memory circuit 64 contains data which is to be sent even after the data is output corresponding to the signal TENOp, the request control circuit 65 outputs "1" as a second request bit R2, or outputs "0" as a second request bit R2 when it is determined that the data buffer memory circuit 64 does not contain data which is to be sent after the data output corresponding to the signal TENOp.

The signal received TENOr is supplied to the request control circuit 65. The request control circuit 65 determines whether or not the received TENOr is equal to its own terminal number, and whether or not the data buffer memory circuit 64 contains data which is to be sent to the network termination unit 10.

The request control circuit 65 determines whether or not the received TENOr is equal to its own terminal number, and whether or not the data buffer memory circuit 64 contains data which is to be sent to the network termination unit 10. When both the signals TENOp and TENOr address its own terminal apparatus, the determination on the data in the data buffer memory circuit 64 is carried out regarding whether or not the data buffer memory circuit 64 contains data which is to be sent, even after the data is output corresponding to the signal TENOp.

When it is determined that the received TENOr is equal to its own terminal number, the request control circuit 65 outputs "1" as a first request bit R1 when the data buffer memory circuit 64 contains data which is to be sent to the network termination unit 10, or outputs "0" as a request bit REQ when the data buffer memory circuit 64 does not contain data which is to be sent to the network termination unit 10.

The multiplexer 63 inserts the above first request bit R1 in a transmission frame as shown in FIG. 18, which is transmitted on the upstream line 30, when the received signal TENOr addresses its own terminal number, and the multiplexer 63 inserts the above second request bit R2 and the output data DATA in a transmission frame as shown in FIG. 18, which is transmitted on the upstream line 30, when the received signal TENOp addresses its own terminal number.

Further, although not shown, a variation of the above sixth embodiment is provided wherein terminal apparatuses each send a request signal R1' or R2 either or both of which includes a quantity of data held in its own terminal apparatus, instead of the above first and second request bits R1 and R2, when the terminal apparatus receives a polling by either of a TENOp or TENOr signals, and the network termination unit 10 receives and memorizes the data quantity instead of the request bit, in the address corresponding to either of the TENOp or TENOr signals, in the polling table 86 of FIG. 19, and send a TENOp signal on the downstream line 40 according to the memorized data quantities. A similar operation to the operation for determining the terminal number TENOp in the network termination unit 10 in the aforementioned second embodiment can be applied to the above variation. In addition, the operation of FIG. 12 is also can be applied to the above variation.

(8) Seventh Embodiment

The seventh embodiment of the present invention is realized by using basically the similar hardware to the above-explained sixth embodiment, except that the control operations by software as explained below, are carried out in the construction of the seventh embodiment. The aforementioned assumption of the small round trip delay in the sixth embodiment, is also made in this embodiment.

Figure 21:
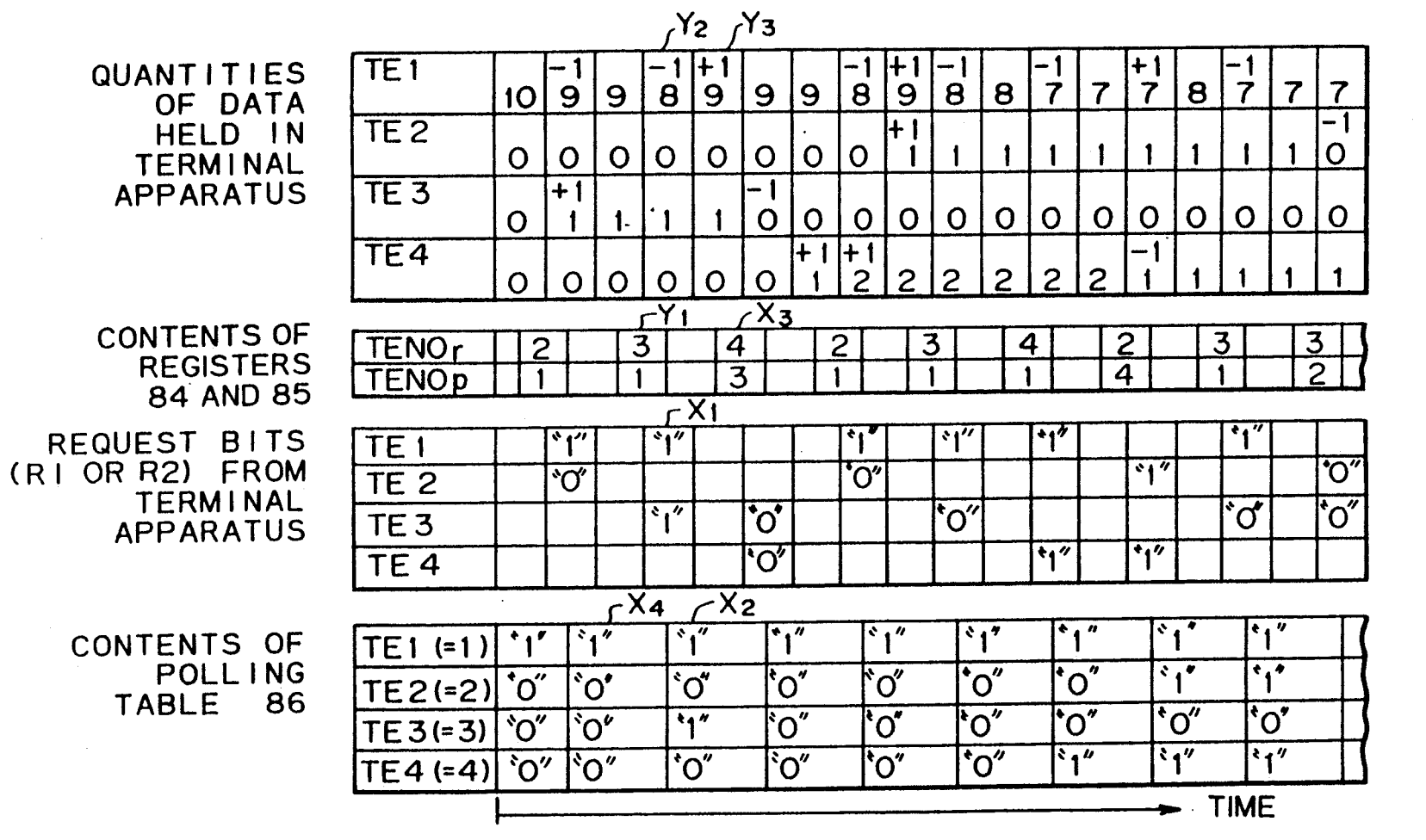

To explain the control procedure for polling in the network termination unit 10, an example of flow of signals in the construction of the network termination unit 100 of FIG. 19, is shown in FIG. 21. FIG. 21 shows an example of variations of the quantities of data held in the terminal apparatuses $20_1$, $20_2$, $20_3$, and $20_4$, the contents TENOp and TENOr of the registers 84 and 85, requests from the terminal apparatuses, and the contents of the polling table 86. In FIG. 21, locations of data in the horizontal direction correspond to a collapse of time, TE1, TE2, TE3, and TE4 respectively denote terminal apparatuses $20_1$, $20_2$, $20_3$, and $20_4$, and terminal numbers "1", "2", "3", and "4" are assigned to the terminal apparatuses $20_1$, $20_2$, $20_3$, and $20_4$, respectively.

Figure 22:
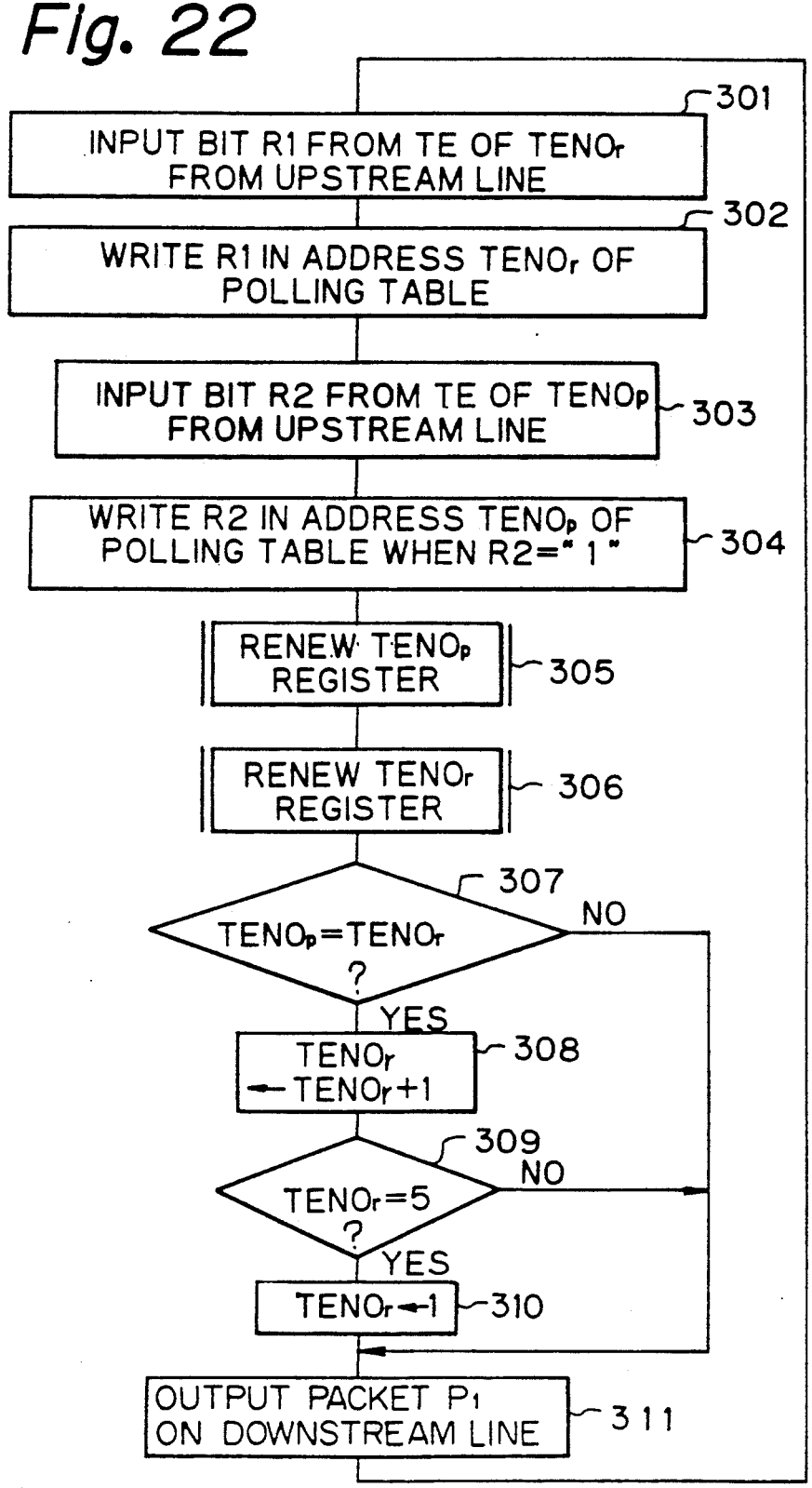
FIG. 22 shows the operation of the controller 87 in the network termination unit 10 in FIG. 19.

FIG. 22 shows the operation of the controller 87 in the network termination unit 10 in FIG. 19.

In the step 301, a first request bit R1 which is contained in a packet $P_2$ received from the upstream line 40, is input into the controller 87, and then, in the step 302, the bit R1 is written in an address which is equal to a corresponding terminal number TENOr in the polling table 86. The address is determined in the same way as the sixth embodiment.

In the step 303, a second request bit R2 which is contained in a packet $P_1$ received from the upstream line 30, is input into the controller 07, and then, in the step 304, when the second request bit R2 is "1", the bit R2 is written in an address which is equal to a corresponding terminal number TENOp in the polling table 86. The address is determined in the same way as the sixth embodiment. These operations in the steps 301 through 304 have the same effect as the corresponding writing operation in the sixth embodiment.

In the steps 305 and 306, the contents of the TENOp register 85 and the TENOr register 84 are respectively renewed. The details of these steps 305 and 306 are explained later with reference to FIGS. 23 and 24, respectively.

In the step 307, it is determined whether or not the content TENOp of the TENOp register 84 is equal to the content TENOr of the TENOr register 85. When it is determined that the TENOp is equal to the TENOr, the terminal number TENOr is incremented by one in the step 308, where terminal numbers "1", "2", "3", and "4" are assigned to the terminal apparatuses $20_1$, $20_2$, $20_3$, and $20_4$, respectively. In the step 309, it is determined whether or not the incremented value exceeds the total number 4 of the terminal apparatuses. If it is determined that the incremented value exceeds the total number 4, the TENOr is set to "1" in the step 310.

According to the above operation of the steps 307 to 310, a TENOp signal and a TENOr signal in a packet $P_1$ address different terminal apparatuses. Since a terminal apparatus addressed by a TENOp signal can send a second request bit R2, the above operation of the steps 307 to 310 enables an effective collection of request for sending data from the terminal apparatuses.

Then, a packet $P_1$ containing the above terminal numbers TENOp and TENOr is output on the downstream line 40 in the step 311. The above operations of the steps 301 through 311 are carried out for each cycle sending a packet $P_1$.

Figure 23:
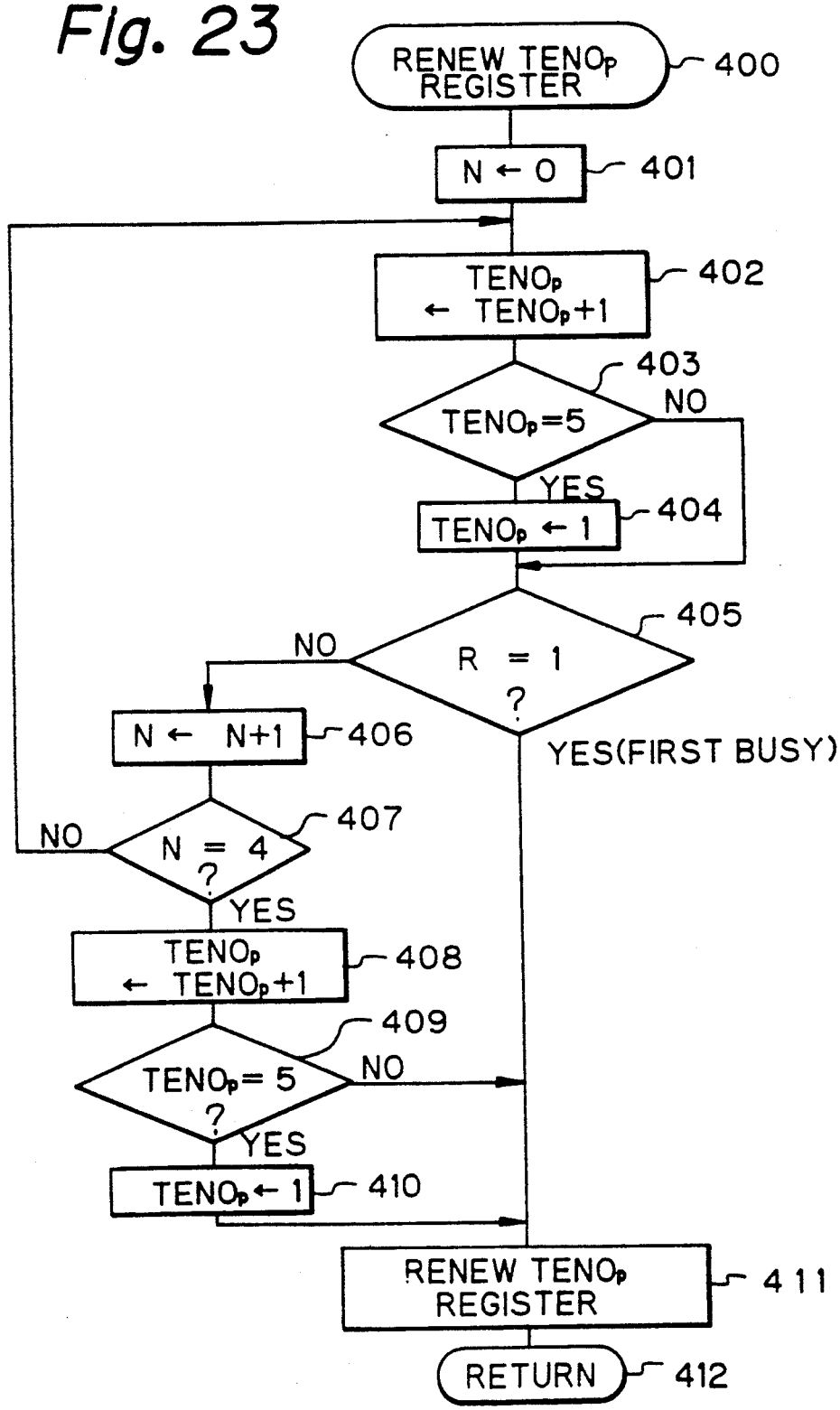
FIG. 23 shows the details of the step 305 in FIG. 22.

FIG. 23 shows the details of the step 305 in FIG. 22. The operation of FIG. 23 is basically equivalent to the aforementioned operation for setting a terminal number TENOp in the TENOp register 84 in the sixth embodiment.

In the step 401, an index N for scanning the polling table 86 is set to zero, and then, in the step 402, the address TENOp for accessing the polling table 86 is incremented by one. When the incremented value is exceeds the total number 4 of the terminal apparatuses $20_1$, $20_2$, $20_3$, and $20_4$, the terminal number TENOp is set to "1" in the steps 403 and 404. In the step 405, it is determined whether or not the content in the address TENOp is "1", i.e., whether or not a request bit "1" is memorized in the address TENOp. When it is determined that the content in the address TENOp is "1", the contents of the TENOp register 84 is renewed by the above address TENOp in the step 411.

When it is determined that the content in the address TENOp is not "1", the index N is incremented by one in the step 406, and when it is determined that the index N is not equal to the total number 4 of the addresses of the polling table 86 (the total number 4 of the terminal apparatuses $20_1$, $20_2$, $20_3$, and $20_4$), the operations of the steps 402 to 405 are repeated until the "1" is detected in the step 405, or it is determined that the index N is determined equal to 4 in the step 407. Namely, the the aforementioned cyclical pointing of an address wherein "1" is memorized, is realized by the above steps 401 to 407.

When it is determined that the index N is determined equal to 4 in the step 407, i.e., no request bit "1" is detected in the polling table 86, A new terminal number TENOp which is to be set in the TENOp register 84, is generated by cyclically changing the old content of the TENOp register 84, by one. To do this, the old content of the TENOp register 84 is incremented by one in the step 408, and when the incremented value exceeds the total number 4 of the terminal apparatuses $20_1$, $20_2$, $20_3$, and $20_4$, the value TENOp is set to "1" in the steps 409 and 410. Then, the content of the TENOp register 84 is renewed by the new terminal number TENOp in the step 411.

Figure 24:
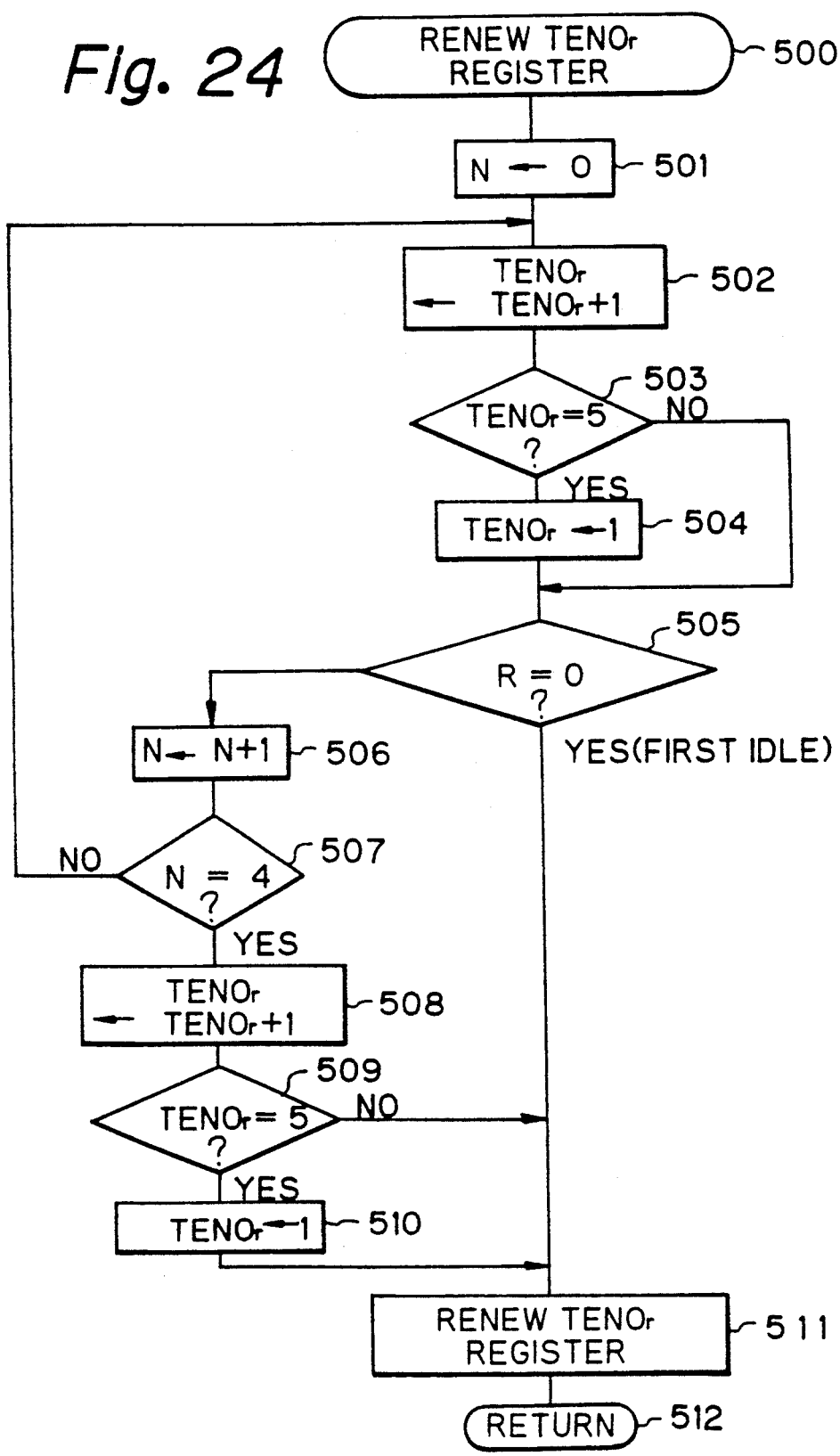
FIG. 24 shows the details of the step 306 in FIG. 22.

FIG. 24 shows the details of the step 306 in FIG. 22. The operation of FIG. 23 is carried out for primarily sending an allowance to send a request for sending data to the terminal apparatuses a request from which the network termination unit 10 does not hold at the moment.

In the step 501, an index N for scanning the polling table 86 is set to zero, and then, in the step 502, the address TENOr for accessing the polling table 86 is incremented by one. When the incremented value is exceeds the total number 4 of the terminal apparatuses $20_1$, $20_2$, $20_3$, and $20_1$, the terminal number TENOr is set to "1" in the steps 503 and 504. In the step 505, it is determined whether or not the content in the address TENOr is "0", i.e., whether or not a request bit "1" is memorized in the address TENOr. When it is determined that the content in the address TENOr is not "1", the contents of the TENOr register 85 is renewed by the above address TENOr in the step 511.

When it is determined that the content in the address TENOr is "1", the index N is incremented by one in the step 506, and when it is determined that the index N is not equal to the total number 4 of the addresses of the polling table 86 (the total number 4 of the terminal apparatuses $20_1$, $20_2$, $20_3$, and $20_4$), the operations of the steps 502 to 505 are repeated until the "0" is detected in the step 505, or it is determined that the index N is determined equal to 4 in the step 507.

When it is determined that the index N is determined equal to 4 in the step 507, i.e., no request bit "0" is detected in the polling table 86, a new terminal number TENOr which is to be set in the TENOr register 85, is generated by cyclically changing the old content of the TENOr register 85, by one. To do this, the old content of the TENOr register 85 is incremented by one in the step 508, and when the incremented value exceeds the the total number 4 of the terminal apparatuses $20_1$, $20_2$, $20_3$, and $20_4$, the value TENOr is set to "1" in the steps 509 and 510. Then, the content of the TENOr register 85 is renewed by the new terminal number TENOr in the step 511.

The operation of each terminal apparatus in the seventh embodiment is the same as each terminal apparatus in the sixth embodiment.

Thus, according to the above operations in the seventh embodiment of the present invention, successive outputs of allowances to send data, or to send a request for sending data, are respectively inhibited except when requests for sending data from one terminal apparatus only are memorized in the network termination unit 10.

(9) Eighth and Ninth Embodiments

Otherwise, in the basically same construction as the above seventh embodiment, when determining a terminal apparatus to which an allowance to send data is given, successive allowances may be given to a terminal apparatus from which a second request bit R2 in "1" is received. When the network termination unit 10 memorizes requests for sending data from more than one terminal apparatuses, to prevent a successive and exclusive data sending by a terminal apparatus, the number of the successive allowances to a terminal apparatus may be limited to a predetermined number. Optionally, successive outputs of allowances may be given to a terminal apparatus as long as a second request bit R2 in "1" is received from the terminal apparatus.

In the eighth embodiment of the present invention (although specifically not shown), the number of the successive outputs is limited to a predetermined number when the network termination unit 10 memorizes requests for sending data from more than one terminal apparatuses. In order to allow the predetermined number of successive outputs of allowances to a terminal apparatus, the controller 87 counts the number of the successive outputs of allowances to send data to each terminal apparatus, and, when a second request bit R2 is received from the terminal apparatus, the controller 87 determines whether or not the received R2 value is "1". When it is determined that the R2 value is "1", the terminal number of the terminal apparatus maintained in the TENOp register 84 in the next cycle of sending a packet $P_1$, and increments the above count of the successive outputs of allowances to send data to each terminal apparatus. After that, the controller 87 determines whether or not the count exceeds the predetermined number. When the count exceeds the predetermined number, or when the received R2 bit is not "1", the terminal number in the TENOp register 84 is renewed to another terminal number of a terminal apparatus from which a request for sending data is memorized in the network termination unit 10.

The above counting operation may begin midway in an output operation of successive allowances which begins when the network termination unit 10 memorizes a request for sending data from only one terminal apparatus, when a request for sending data from another terminal apparatus is received.

In the ninth embodiment of the present invention (although specifically not shown), in order to allow successive outputs of allowances to a terminal apparatus as long as a second request bit R2 in "1" is received from the terminal apparatus, the controller 87 does not carry out the above counting operation, and maintains the terminal number TENOp in the TENOp register 84 just until the newly received R2 bit becomes "0". When the newly received R2 bit becomes "0", the operation goes to the operations after the steps 304 of FIG. 22.

(10) Tenth Embodiment

Figure 25A:
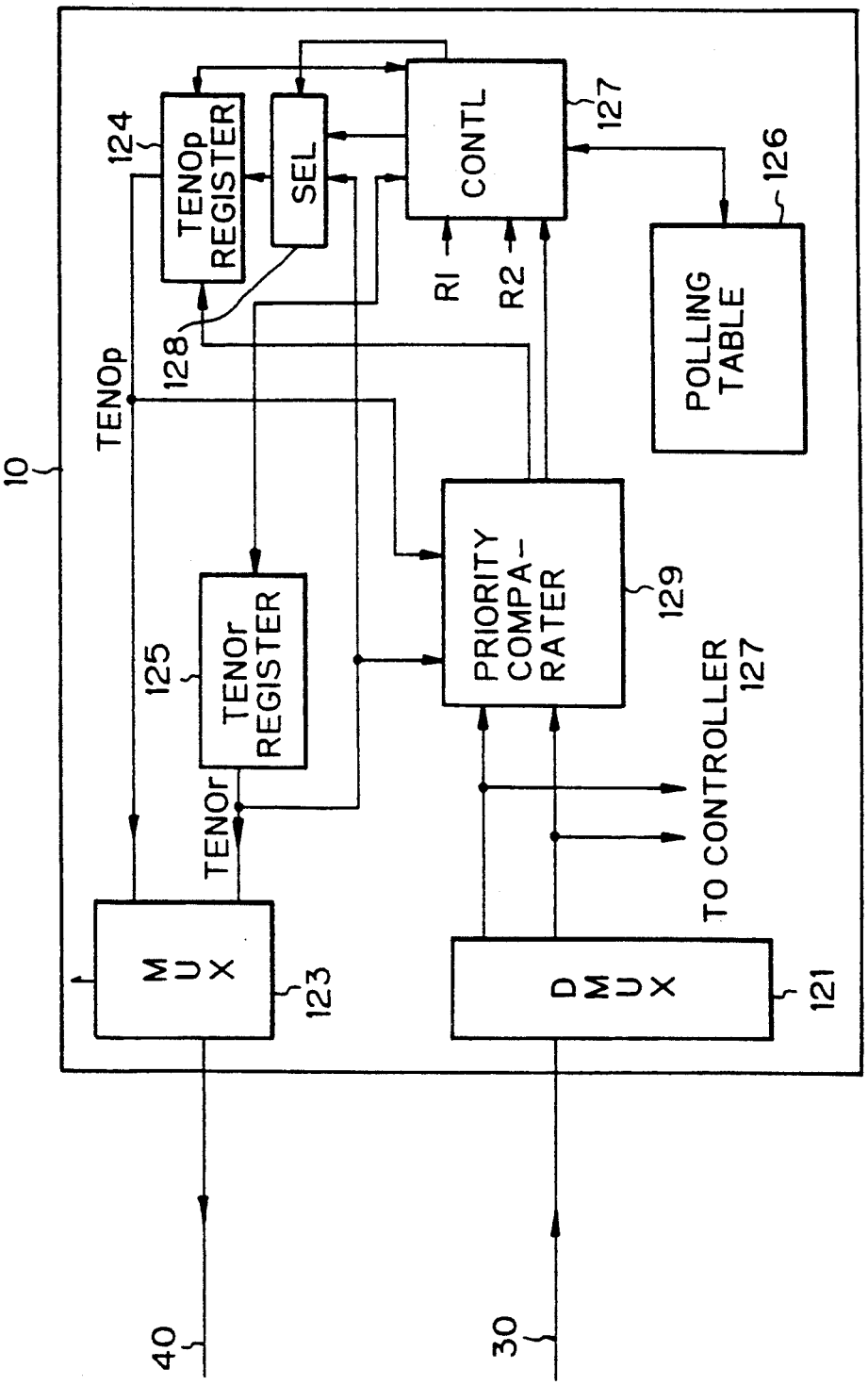
FIGS. 25A and 25B show constructions of the network termination unit 10 in the tenth embodiment of the present invention.

FIG. 25A shows a construction of the network termination unit 10 in the tenth embodiment of the present invention.

In FIG. 25A, reference numeral 121 denotes a demultiplex, 123 denotes a multiplexer, 124 denotes a TENOp register, 125 denotes a TENOr register, 126 denotes a polling table, 127 denotes a controller, 128 denotes a selector, and 129 denotes a priority comparator.

In the tenth embodiment, a priority level regarding data sending is assigned for each terminal apparatus, and in the construction of FIG. 25A, the priority comparator 129 and the selector 128 are provided.

The functions of the components in FIG. 25A, except the priority comparator 129, are each the same as the corresponding component in the fifth or seventh embodiment (FIG. 19) of the present invention.

The priority comparator 129 memorizes the above assigned priority levels of all the terminal apparatuses, receives first and second request bits R1 and R2 both of which have been transmitted by packets $P_2$ and $P_3$, the current output of the TENOp register 124, and the terminal number corresponding to the above received second request bit R1 (i.e., the output of the TENOr register 125). The priority comparator 129 compares the priority level corresponding to the current output of the TENOp register 124, and the priority level of the terminal apparatus which has sent the received second request bit R1, based on the above memorized priority levels and the current outputs of the TENOp register 124 and the TENOr register 125, when both the received request bits R1 and R2 are "1".

The selector 128 is provided in the input side of the TENOp register 124, and receives the output of the TENOr register 125 and the TENOp value given by the controller 127 by the operation as explained in the fifth or seventh embodiment.

When the priority level of the R1 is higher than the priority level corresponding to the current output of the TENOp register 124, the priority comparator 129 controls the selector 128 to select the output of the TENOr register 125 as its own output, and controls the TENOp register 124 to set the output of the selector 128. In the other case, the selector 128 selects the above TENOp value given by the controller 127 by the operation as explained in the fifth or seventh embodiment.

In the aforementioned second embodiment, allowances to send data are successively sent to a terminal apparatus until a number of allowances corresponding to a quantity of data REQ-DQ are sent to the terminal apparatus, and in the ninth embodiment, allowances to send data are successively sent to a terminal apparatus from which a second request bit R2 in "1" is received. In the construction where the above operation of the tenth embodiment is combined with either of the second or ninth embodiment, when a request for sending data with a high priority is received, the network termination unit 10 can immediately change the content of the TENOp register 124 to a TENOp signal addressing the terminal apparatus which has sent the request, and can send an allowance to send data to the terminal apparatus.

In addition, the above functions of the priority comparator 129 and the selector 128 may be included in the function of the controller 127.

Figure 25B:
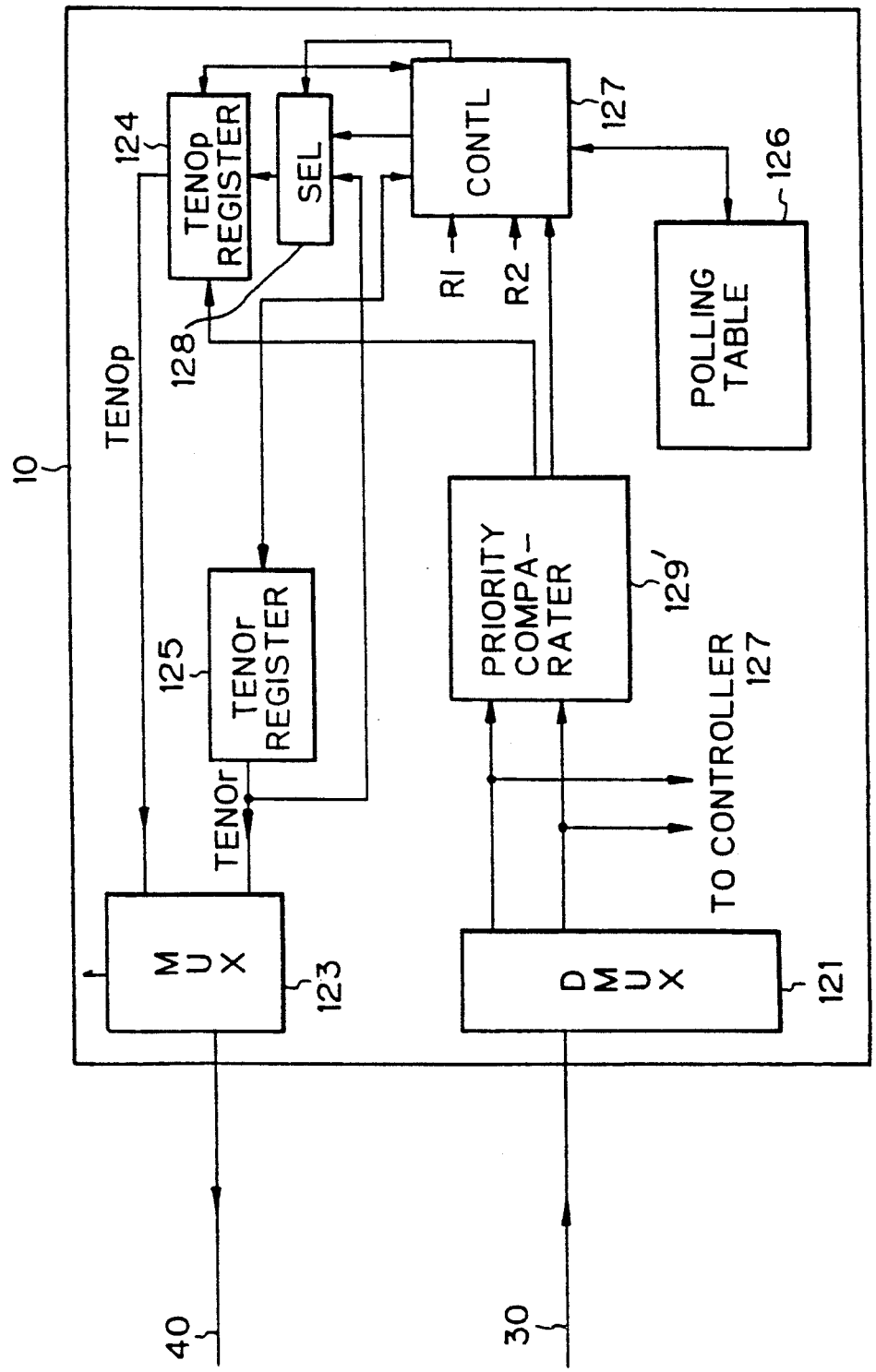

FIG. 25B shows another construction of the network termination unit 10 in the tenth embodiment of the present invention.

The differences of the construction of FIGS. 25B from the construction of FIG. 25A are as follows.

In the construction of FIG. 25B, it is assumed that the request signals R1 and R2 each include information on the priority level of the terminal apparatus from which the request signal is output.

Accordingly, the priority comparator 129' in FIG. 25B need not memorize the above assigned priority levels of all the terminal apparatuses, and need not receive the TENOr signal and the TENOp signal to compare priority levels of the requests R1 and R2 in the network termination unit 10.

All other construction and operations in FIG. 25B are the same as FIG. 25A.

(11) Dispersion of Polling Addresses

Through all the embodiments of the present invention, when no request for sending data from the terminal apparatuses is memorized in the network termination unit 10, for example, in the initial state, the network termination unit 10 must collect, in a shortest time, information on which terminal apparatus has data which is to be sent. To effectively carry out the above collecting operation, it is desirable to disperse the terminal numbers which are sent from the network termination unit 10 as signals TENOp and TENOr.

Figure 26:
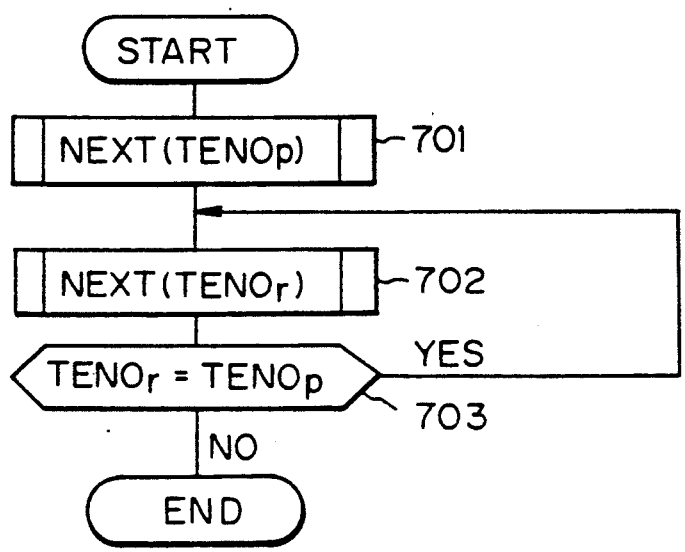
FIG. 26 shows a first example of operation for determining addresses (terminal numbers) which is to be sent from the network termination unit 10, when no request for sending data from the terminal apparatuses is memorized in the network termination unit 10.

FIG. 26 shows a first example of operation for determining polling addresses (terminal numbers) which is to be sent from the network termination unit 10, when no request for sending data from the terminal apparatuses is memorized in the network termination unit 10.

In the step 701, a routine NEXT(TENOp) whereby a cyclically next terminal number TENOp is obtained among a plurality of terminal apparatuses in the system, is carried out.

Figure 27:
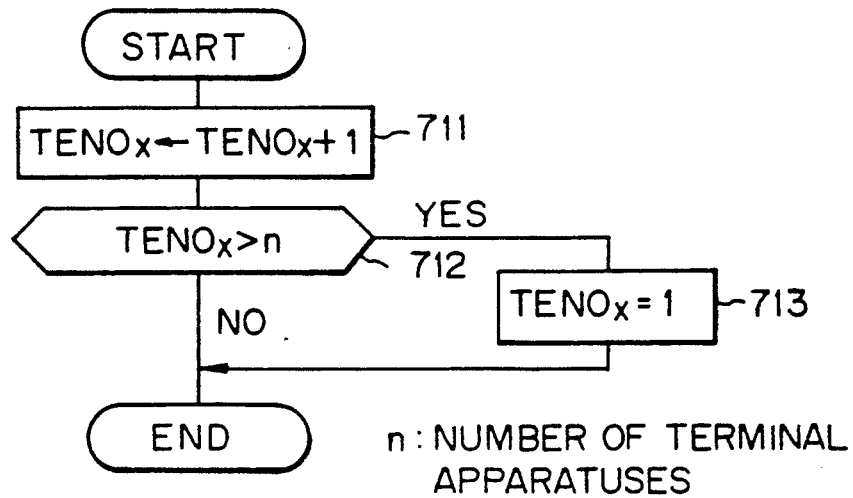
FIG. 27 shows a routine NEXT(TENOp) to obtain a cyclically next terminal number TENOp among a plurality of terminal apparatuses in the system.

The routine NEXT(TENOx) is shown in FIG. 27, where TENOx is either of TENOr or TENOp. Terminal numbers "1", "2", "3", ... "n−1", and "n" are assumed to be assigned to the terminal apparatuses $20_1$, $20_2$, ... $20_{n-1}$, $20_n$ in the construction of FIG. 1, respectively.

In the step 711 of FIG. 27, the terminal number TENOx is incremented by one. In the step 712, it is determined whether or not the incremented terminal number TENOx exceeds the total number n of terminal apparatuses. When it is determined that the incremented terminal number TENOx exceeds the total number n of terminal apparatuses, the terminal number is set to "1" in the step 713.

Returning to FIG. 26, thus, the terminal number TENOp is cyclically incremented in the step 701, and then, the terminal number TENOr is cyclically incremented in the step 702.

In the step 703, it is determined whether or not the above cyclically incremented terminal numbers TENOp and TENOr are equal. When it is determined that the above cyclically incremented terminal numbers TENOp and TENOr are equal, the terminal number TENOr is cyclically incremented again in the step 703.

Thus, two terminal numbers TENOp and TENOr which are sent out from network termination unit 10 in a packet Pl, are made not equal, i.e., the polling addresses are dispersed.

Figure 28:
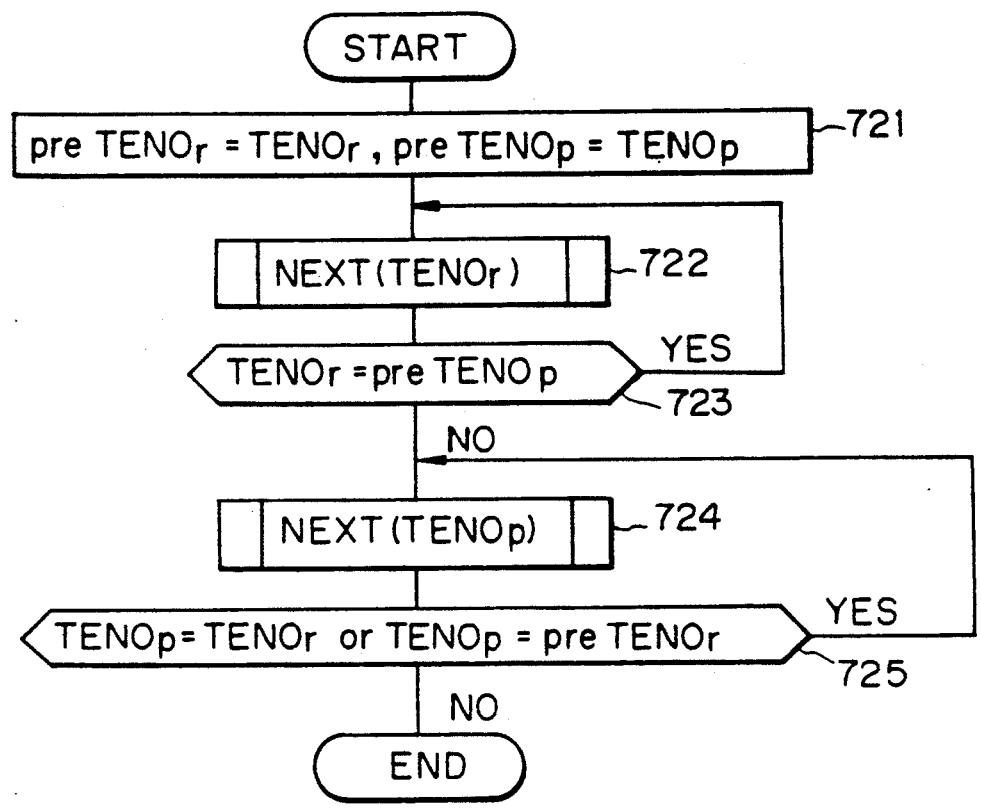
FIG. 28 shows a second example of operation for determining polling addresses (terminal numbers) which is to be sent from the network termination unit 10, when no request for sending data from the terminal apparatuses is memorized in the network termination unit 10.

FIG. 28 shows a second example of operation for determining polling addresses (terminal numbers) which is to be sent from the network termination unit 10, when no request for sending data from the terminal apparatuses is memorized in the network termination unit 10.

In this operation, in addition to the operation of the above first example, a terminal number in a preceding polling is considered for each of terminal numbers TENOp and TENOr.

In FIG. 28, "preTENOp" and "preTENOr" respectively denote terminal numbers which are sent out from the network termination unit 10 in the preceding polling operation.

In the step 721, a terminal number TENOr and a terminal number TENOp are respectively set equal to the above "preTENOp" and "preTENOr".

In the step 722, a cyclically next terminal number TENOr is obtained using the above routine NEXT(TENOx).

In the step 723, it is determined whether or not the above cyclically incremented terminal number TENOr is equal to the above "preTENOp". When it is determined that the above cyclically incremented terminal number TENOr is equal to the above "preTENOp", the terminal number TENOr is cyclically incremented again in the step 722.

Next, in the step 724, a cyclically next terminal number TENOp is obtained using the above routine NEXT(TENOx).

In the step 725, it is determined whether or not the above cyclically incremented terminal number TENOp is equal to the above obtained TENOr, or whether or not the cyclically incremented terminal number TENOp is equal to the above "preTENOr". When either of the determinations in the step 724 is "yes", the terminal number TENOp is cyclically incremented again in the step 724.

Further, generally, terminal numbers in a predetermined number of preceding polling cycles can be memorized, and are used for making terminal numbers TENOr and TENOp in a current polling cycle different from each other and different from the terminal numbers in a predetermined number of preceding polling cycles.

(12) Variation of Format of Transmission Frame on Upstream Line

In all the embodiments explained above, it is assumed that a round trip delay between the network termination unit 10 and the plurality of terminal apparatuses $20_0, 20_1, 20_2, \ldots 20_n$, i.e., a sum of the time it takes to transmit a signal from the network termination unit 10 through the downstream line 40 to any one of the plurality of terminal apparatuses $20_0, 20_1, 20_2, \ldots 20_n$, the time it takes for the terminal apparatus to receive the signal from the downstream line 40 and send out a corresponding signal to the upstream line 30, and the time it takes to transmit the signal from the terminal apparatus through the upstream line 30 to the network termination unit 10. is preset to a constant value, by respectively adjusting in advance the response times in all the terminal apparatus $20_0, 20_1, 20_2, \ldots 20_n$, i.e., the delay times in the terminal apparatuses from the moment receiving the signal from the downstream line 40 to the moment sending out a corresponding signal to the upstream line 30, so as to the above equal the round trip delay for all the terminal apparatuses. This constant round trip delay prevents the interference between the signals from different terminal apparatuses on the upstream line 30, enables the network termination unit 10 to recognize terminal apparatuses corresponding to received requests by holding a terminal number of a polled terminal apparatus using a delay circuit without transmitting a terminal number from each terminal apparatus with the request, and thus, a high transmission rate is achieved.

Figure 29:
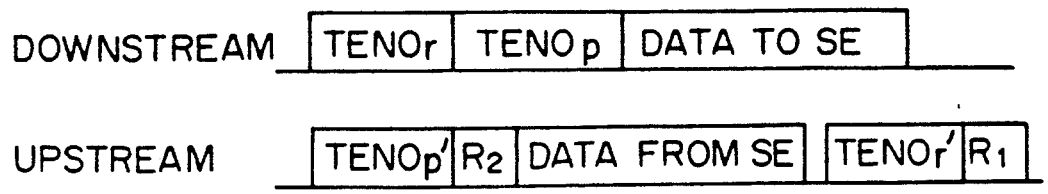
FIG. 29 shows formats of transmission frames used in the system wherein the aforementioned first and second request bits R1 and R2 are transmitted from the terminal apparatuses to the network termination unit 10.

However, when a relatively high transmission rate is not required, the format of transmission frame on the upstream line 30 may be changed to contain a terminal number of the terminal apparatus which outputs the request in the frame. FIG. 29 shows formats of transmission frames used in the system wherein the aforementioned first and second request bits R1 and R2 are transmitted from the terminal apparatuses to the network termination unit 10. Each request bit R1 or R2 is accompanied by a terminal number TENOr' or TENOp' corresponding to the terminal apparatus which outputs the request bit. Although not shown, in the system wherein each transmission frame on the upstream line 30 contains only one request bit, each transmission frame contains the terminal number corresponding to the terminal apparatus which outputs the request bit.

To change each of the aforementioned embodiments of the present invention to use the above format of transmission frame containing a terminal number accompanying each request bit, although not shown, constructions of the network termination unit 10 and each terminal apparatus may be changed as explained below.

Each terminal apparatus may further comprise a register which holds a terminal number which is assigned to its own terminal apparatus, and when a request bit is output from the terminal apparatus, the output of the register (its own terminal number) is also multiplexed with the request bit, or with the request bit and data, in the multiplexer in the terminal apparatus.

The demultiplexer in the network termination unit 10 demultiplexes transmission frames containing the above terminal number accompanying each request bit, and outputs the demultiplexed terminal number with the request bit and data DATA FROM TE. The demultiplexed terminal number is used instead of the aforementioned output of the delay circuit.

(13) Eleventh Embodiment

Figure 30:
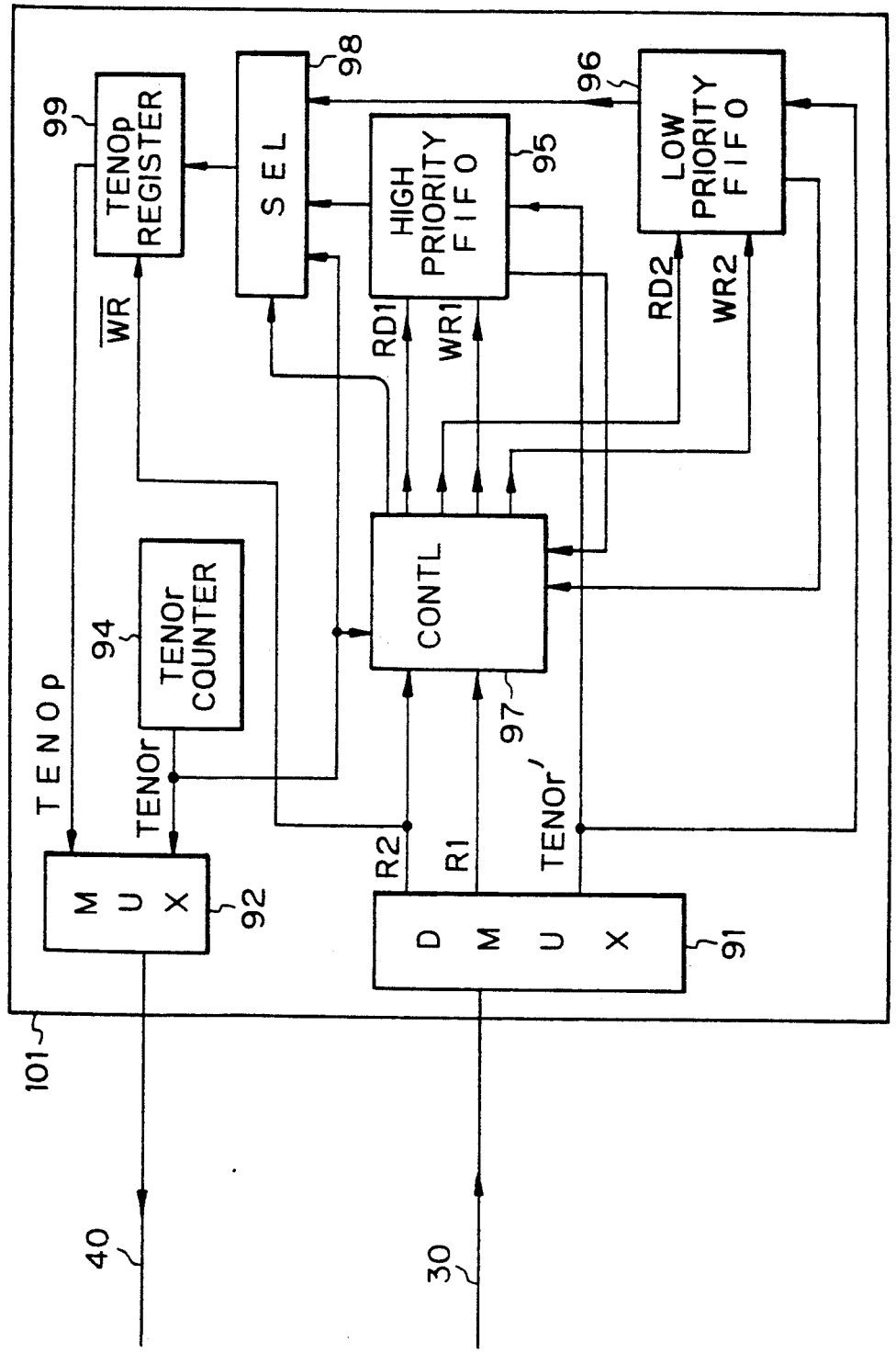
FIG. 30 shows a construction of the network termination unit 10 in the eleventh embodiment of the present invention, wherein the above-mentioned transmission frames of FIG. 29 are used.

FIG. 30 shows a construction of the network termination unit 10 in the eleventh embodiment of the present invention, wherein transmission frames similar to the above-mentioned transmission frames of FIG. 29 are used. As explained below, in the eleventh embodiment, a first request signal R1 and a second request signal R2 in the transmission frame on the upstream line 30 each include information on the priority level of a terminal apparatus from which the request signal is output, and therefore, each request signal is comprised of a plurality of bits.

In FIG. 30, reference numeral 91 denotes a demultiplexer, 92 denotes a multiplexer, 94 denotes a TENOr counter, 95 denotes a high priority FIFO memory, 96 denotes a low priority FIFO memory, 97 denotes a control circuit, 98 denotes a selector, and 99 denotes a TENOp register.

The demultiplexer 91 demultiplexes transmission frames containing the terminal number accompanying each request signal, and outputs the demultiplexed terminal numbers TENOr' and TENOp' with the request signals R1 and R2 and data DATA FROM TE. The request signals R1 and R2 are input into the control circuit 97, and the second request signal R2 is also applied to the TENOp register 99 as a renewal inhibit signal $\overline{WR}$. The demultiplexed terminal number TENOr' is applied to both the high priority and low priority FIFO memories 95 and 96.

The high priority FIFO memory 95 and the low priority FIFO memory 96, are respectively provided for memorizing requests for sending data from terminal apparatuses which are assigned to a high priority level and a low priority level.

The control circuit 97 memorizes the above assigned priority levels of all the terminal apparatuses, and controls the high priority FIFO memory 95, the low priority FIFO memory 96, and the selector 98, as explained below.

The construction of the high priority FIFO memory 95, the low priority FIFO memory 96, and the selector 98 in FIG. 30, corresponds to the construction of the high priority data sending polling address generating circuit 88, the low priority data sending polling address generating circuit 89, and the selector 86 in FIG. 17.

Figure 31:
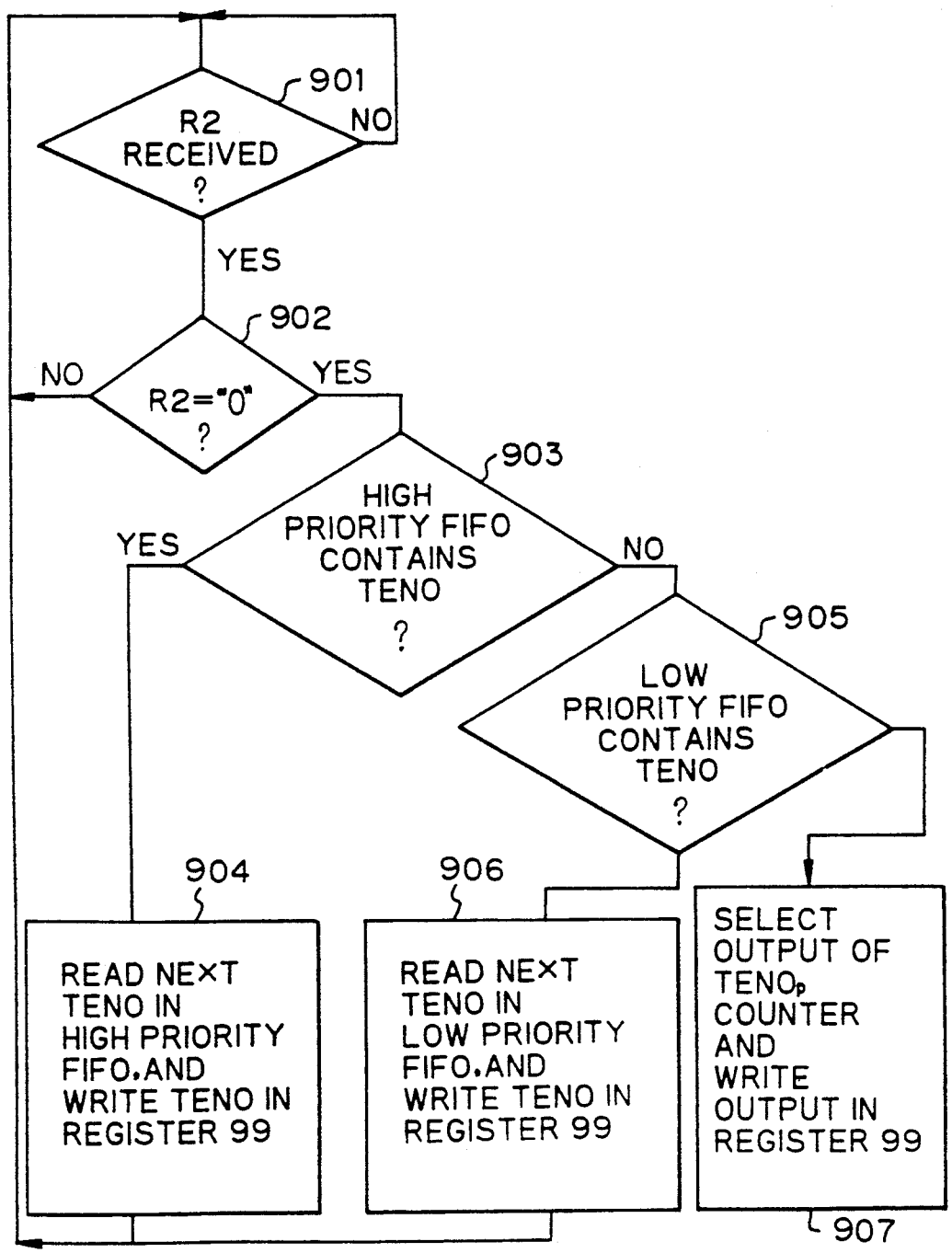
FIGS. 31 and 32 respectively show the control operations of the control circuit 91, responding to receptions of the request bits R1 and R2.
Figure 32:
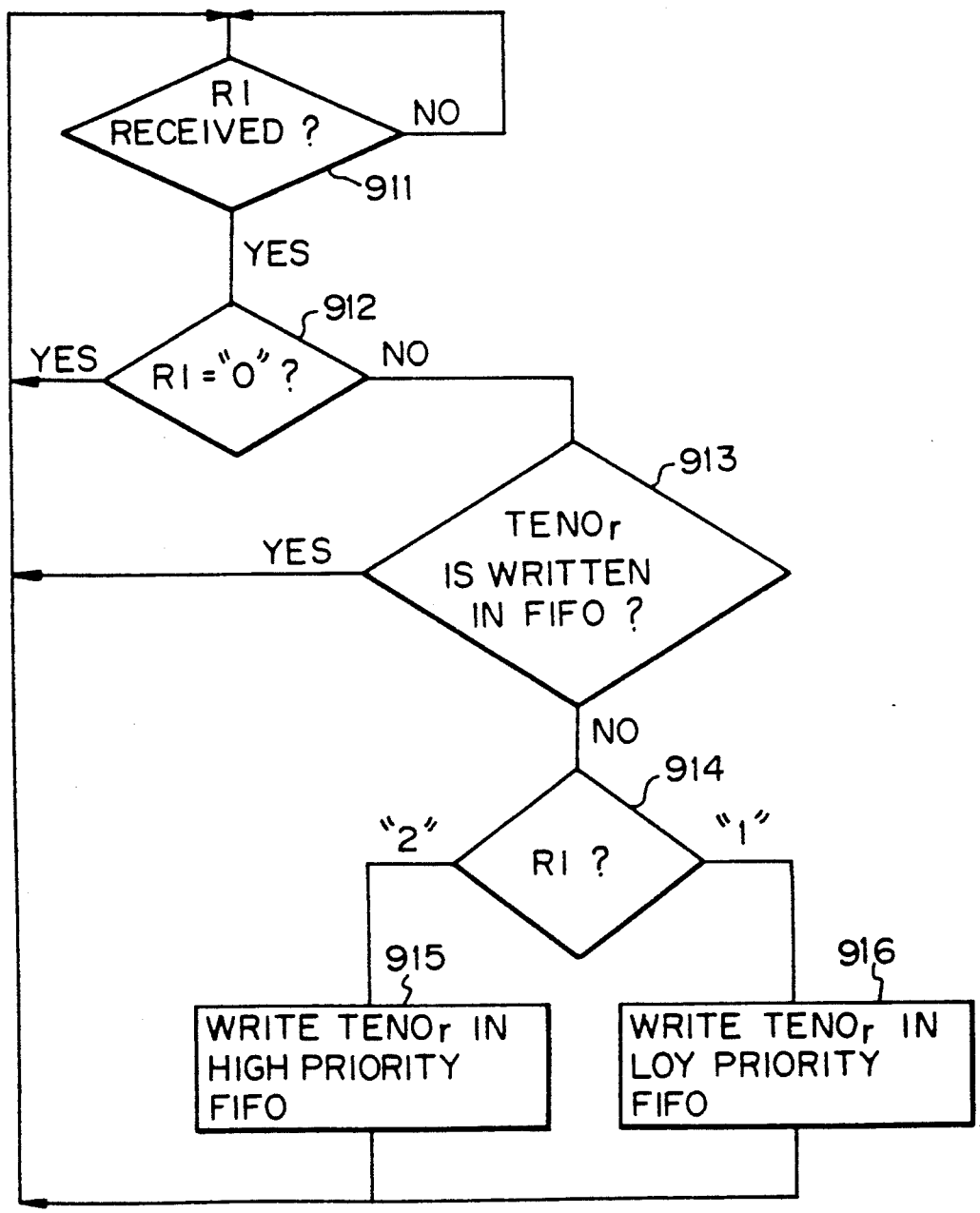

FIGS. 31 and 32 respectively show the control operations of the control circuit 91, responding to receptions of the request signals R1 and R2.

In the step 901 of FIG. 31, it is determined whether or not a second request signal R2 is received. When it is determined that a second request signal R2 is received, it is determined whether or not the received second request signal R2 is zero in the step 902. When it is determined that the signal R2 is zero, it is determined whether or not the high priority FIFO memory 95 contains a terminal number in the step 903.

When it is determined that the high priority FIFO memory 95 contains a terminal number, in the step 904, the control circuit 97 controls the high priority FIFO memory 95 to output an oldest terminal number memorized therein, and controls the selector 98 to select the output of the high priority FIFO memory 95 as its own output. The output of the selector 98 is applied to the TENOp register 99.

When it is determined that the high priority FIFO memory 95 does not contain a terminal number, it is determined whether or not the low priority FIFO memory contains a terminal number 96 in the step 905. When it is determined that the low priority FIFO memory contains a terminal number 96, the control circuit 97 controls the low priority FIFO memory 96 to output an oldest terminal number memorized therein, and controls the selector 98 to select the output of the low priority FIFO memory 96 as its own output. The output of the selector 98 is applied to the TENOp register 99.

When it is determined that the low priority FIFO memory 96 does not contain a terminal number, the control circuit 97 controls the selector 98 to select the output of the TENOr register 94 as its own output.

At the time of the above three types of selections, the above mentioned renewal inhibit signal $\overline{WR}$ which is applied to the TENOp register 99 is effective ("0") since the second request signal R2 is "0", and therefore, the above output of the selector 98 is written in the TENOp register 99.

In the step 911 of FIG. 32, it is determined whether or not a first request signal R1 is received. When it is determined that a first request signal R1 is received, it is determined whether or not the received first request signal R1 is zero in the step 912. When it is determined that the signal R1 is zero, the operation goes to the step 911. Or, when it is determined that the signal R1 is not zero, it is determined whether or not either of the high priority FIFO memory 95 or the low priority FIFO memory 96 contains a terminal number in the step 913. When it is determined that neither of the high priority FIFO memory 95 nor the low priority FIFO memory 96 contains a terminal number, the operation goes to the step 911.

When it is determined that either of the high priority FIFO memory 95 or the low priority FIFO memory 96 contains a terminal number, it is determined what the priority level corresponding to the first request signal R1 is, in the step 914. When it is determined that the priority level corresponding to the first request signal R1 is high, the control circuit 97 controls the high priority FIFO memory 95 to input the terminal number which is applied to the FIFO memory 95 in the step 915. When it is determined that the priority level corresponding to the first request signal R1 is low, the control circuit 97 controls the low priority FIFO memory 96 to input the terminal number which is applied to the FIFO memory 96 in the step 916. The terminal number which is applied to the FIFO memory 96 is supplied from the demultiplexer 91 as mentioned before.

(14) Twelfth Embodiment

Figure 33A:
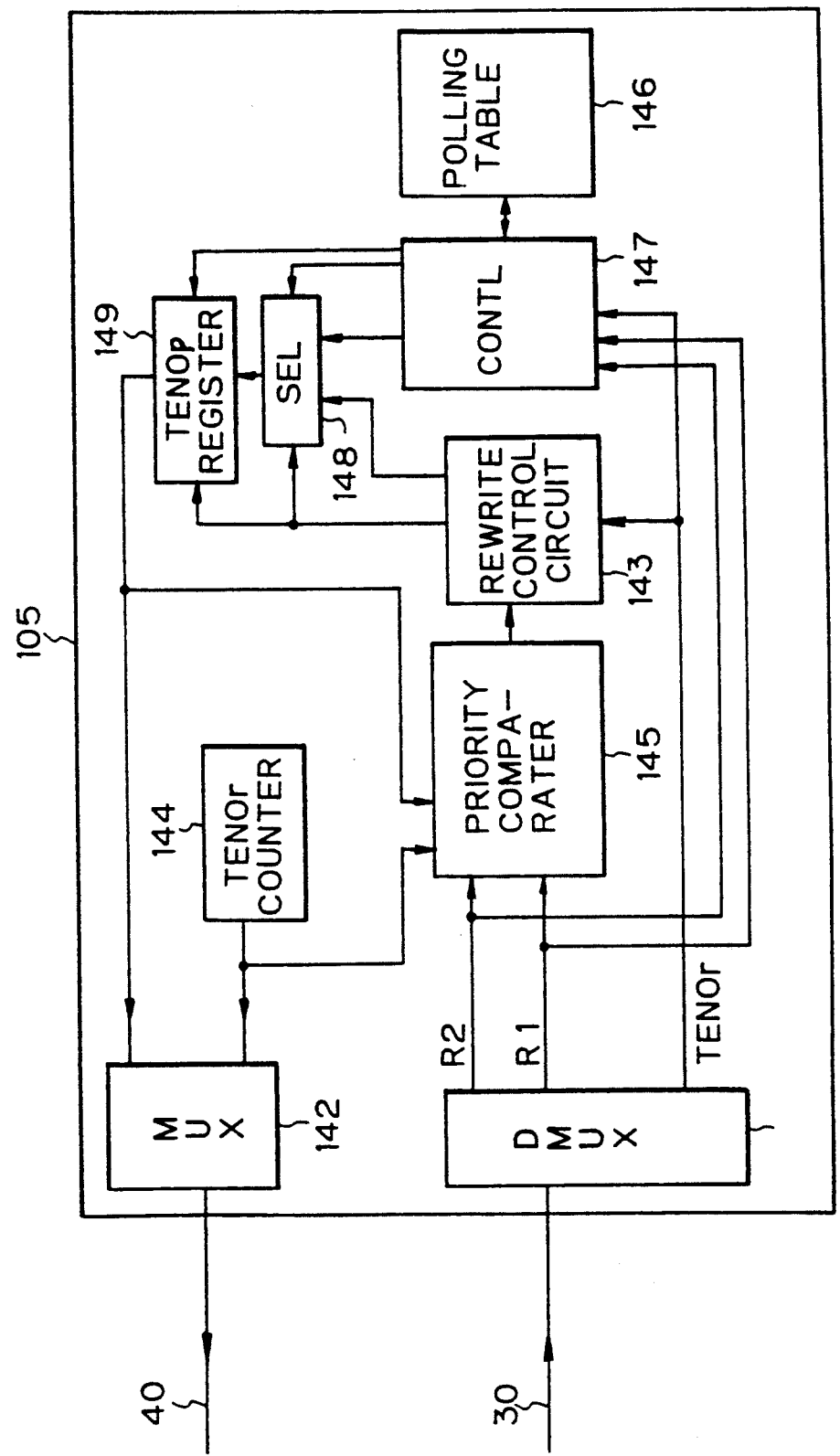
FIG. 33A and 33B show constructions of the network termination unit 10 of the twelfth embodiment of the present invention, wherein the aforementioned transmission frames of FIG. 29 are used.

FIG. 33A shows a construction of the network termination unit 10 of the twelfth embodiment of the present invention, wherein the aforementioned transmission frames of FIG. 29 are used. The twelfth embodiment of the present invention corresponds to the aforementioned the tenth embodiment of the present invention wherein the aforementioned transmission frames of FIG. 18 are used.

In FIG. 33A, reference numeral 141 denotes a demultiplexer, 142 denotes a multiplexer, 143 denotes a rewrite control circuit, 144 denotes a TENOr counter, 145 denotes a priority comparator, 146 denotes a polling table, 147 denotes a controller, 148 denotes a selector, and 149 denotes a TENOp register.

In the twelfth embodiment, a priority level regarding data sending is assigned for each terminal apparatus, and in the construction of FIG. 33A, the priority comparator 145 and the selector 148 are provided.

The functions of the components in FIG. 33A, except the priority comparator 145, the rewrite control circuit 143, a polling table 146, and the controller 147, are each the same as the corresponding component in the eleventh embodiment (FIG. 30) of the present invention, respectively. The functions of the polling table 146 and the controller 147 in FIG. 33A, are the same as polling table 126 and the controller 127 in FIG. 25, except the polling table 146 and the controller 147 in FIG. 33A receives the received TENOr signal from the demultiplexer 141.

The priority comparator 145 memorizes the above assigned priority levels of all the terminal apparatuses, receives first and second request signals R1 and R2, the current output of the TENOp register 149, and the output of the TENOr counter 144. The priority comparator 145 compares the priority level corresponding to the current output of the TENOp register 149, and the priority level of the terminal apparatus which has sent the received second request signal R1, based on the above memorized priority levels and the current outputs of the TENOp register 149 and the TENOr counter 144, when both the received request signals R1 and R2 are "1".

When the priority level of the R1 is higher than the priority level corresponding to the current output of the TENOp register 124, the priority comparator 145 controls the rewrite control circuit 143 to apply the TENOr signal which is output from the demultiplexer 141, to the TENOp register 149, and controls the TENOp register 149 to input the above applied TENOr signal.

According to the above operation, when a request for sending data with a high priority is received, the network termination unit 10 can immediately change the content of the TENOp register 144 to a TENOp signal addressing the terminal apparatus which has sent the request, and can send an allowance to send data to the terminal apparatus.

In addition, the above functions of the rewrite control circuit 143, the priority comparator 145, and the selector 148 may be included in the function of the controller 147.

Figure 33B:
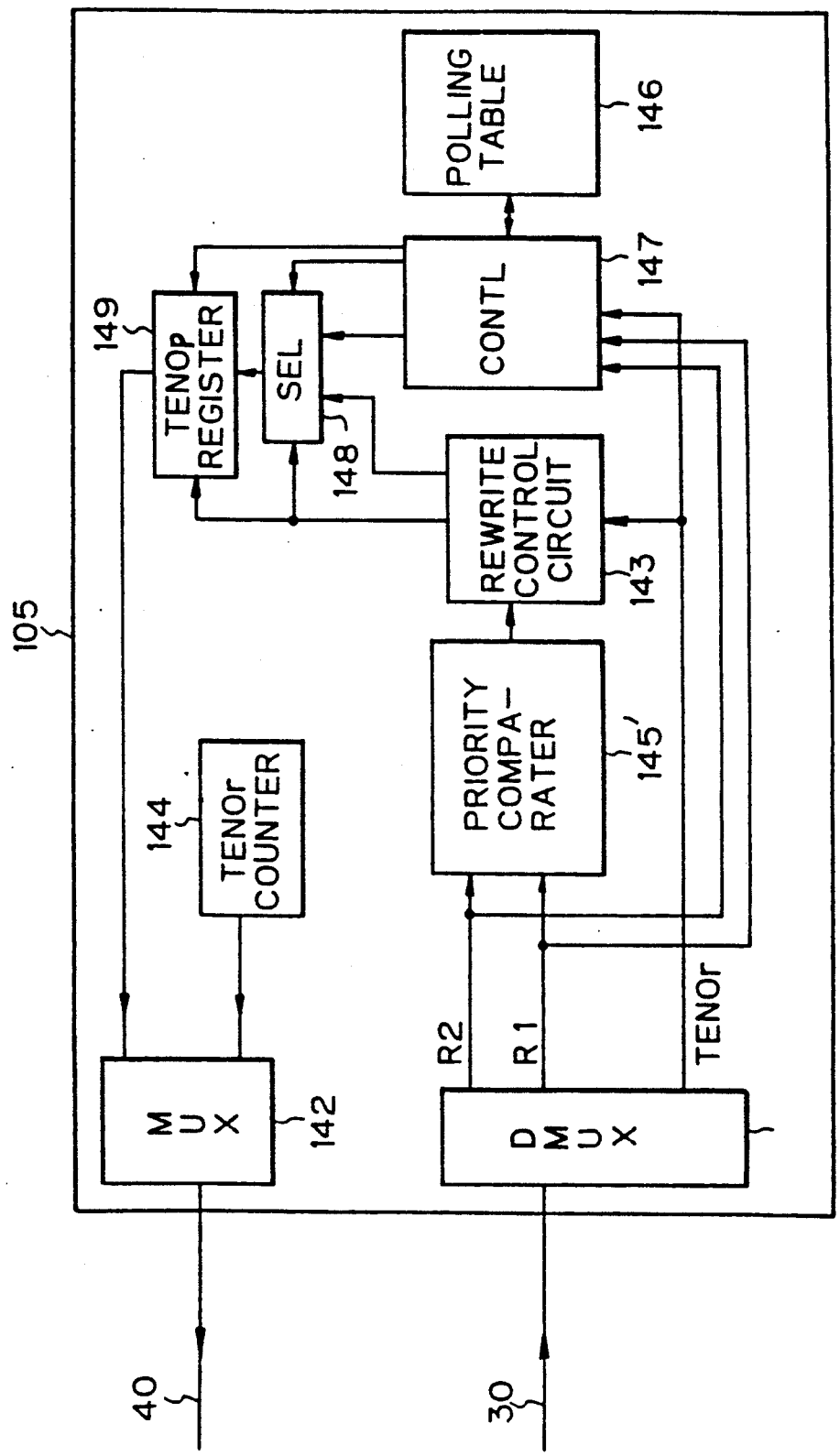

FIG. 33B shows another construction of the network termination unit 10 in the twelfth embodiment of the present invention.

The differences of the construction of FIGS. 33B from the construction of FIG. 33A are as follows.

In the construction of FIG. 33B, it is assumed that the request signals R1 and R2 each include information on the priority level of the terminal apparatus from which the request signal is output.

Accordingly, the priority comparator 145' in FIG. 33B need not memorize the above assigned priority levels of all the terminal apparatuses, and need not receive the TENOr signal and the TENOp signal to compare priority levels of the requests R1 and R2 in the network termination unit 10.

All other construction and operations in FIG. 33B are the same as FIG. 33A.

(15) Frequency of Polling for Collecting Requests for Sending Data

In all the embodiments explained above, transmission frames on the upstream line 30 have a format as shown in FIG. 4, 5, 9, 14, 18, or 29. Namely, each transmission frame contains both a terminal number for addressing a terminal apparatus to which an allowance to send a request for sending data, and a terminal number for addressing a terminal apparatus to which an allowance to send data. However, when there is a tendency for the quantity of data which is to be sent toward the network termination unit 10 from each terminal apparatus, to exceed the quantity which can be transmitted by one transmission frame, and further, when the transmission frames on the upstream line 30 contain the aforementioned second request signal R2, or the aforementioned data quantity RED-DQ, it is not efficient to send a terminal number for addressing a terminal apparatus to which an allowance to send a request for sending data, in each cycle of sending a terminal number for addressing a terminal apparatus to which an allowance to send data from the network termination unit 10. Namely, the frequency of sending a terminal number for addressing a terminal apparatus to which an allowance to send a request for sending data, may be reduced. For example, a terminal number for addressing a terminal apparatus to which an allowance to send a request for sending data, may be sent from the network termination unit 10 once for a predetermined number of transmission frames which are successively output from the network termination unit 10. According to the above reduction, total transmission efficiency is improved.

(16) Other Types of Connections Between the Master Station and Slave Stations, and Combinations of the Above Embodiments All the above explanations are made based on the type of connection between the master station and the slave stations as shown FIGS. 2 and 3. However, the techniques of all the above embodiments can be applied to any type of connection between the master station and the slave stations, as long as a signal way from the master station to each slave station and a signal way from each slave station to the master station exists. For example, the techniques of the present invention can be applied to a ring-type connection wherein the master station and the slave stations are connected to a ring-type transmission line, or a star-type connection wherein all the slave stations are each connected with a two-way transmission line.

In addition, although not described respectively, all the possible combinations of the techniques in the above-explained embodiments are included in the scope of the present invention. For example, a system wherein slave stations sends all of the request signals R1 and R2, the priority signal, and the data quantity, can be constructed as a combination of the aforementioned embodiments.

We claim:

1. A communication system comprising:
   a master station;
   a plurality of slave stations;
   a transmission line for transmitting a signal between said master station and said plurality of slave stations;
   said master station comprising:
      frame generating means for successively generating and transmitting a frame which contains information;
      request sending allowance signal generating means for generating, for each frame, a request sending allowance signal which addresses one of said plurality of slave stations to give an allowance to send a request for sending data, on said transmission line;
      request receiving means for receiving a request from one of said plurality of slave stations;
      request memorizing means for memorizing one or more requests from one or more slave stations; and
      data sending allowance signal generating means for generating, for each frame, a data sending allowance signal which addresses one of said plurality of slave stations to give an allowance to send data, on said transmission line, according to a request which is memorized in said request memorizing means;
      said frame generating means inserting said request sending allowance signal and said data sending allowance signal in each frame when said frame generating means generates and transmits a frame;
   each of said slave stations comprising:
      request sending allowance signal detecting means for detecting a request sending allowance signal which addresses its own slave station, on said transmission line;
      data sending allowance signal detecting means for detecting a data sending allowance signal which addresses its own slave station, on said transmission line;
      request sending means for sending a request for sending data on said transmission line to said master station when its own slave station detects a request sending allowance signal which addresses its own slave station; and
      data sending means for sending data on said transmission line to said master station when its own slave station detects a data sending allowance signal which addresses its own slave station.

2. A communication system according to claim 1, wherein said transmission line comprises,
   a downstream line for transmitting a signal from said master station to said plurality of slave stations; and
   an upstream line for transmitting a signal from one or more of said plurality of slave stations to said master station.

3. A communication system according to claim 1, wherein each of said slave stations further comprises an additional request sending means for sending an additional request for sending data to said master station in addition to data which is sent to said master station in the same frame as the additional request, when its own slave station detects a data sending allowance signal which addresses its own slave station.

4. A communication system according to claim 3, wherein said master station further comprises an additional request detecting means for detecting said additional request which is sent from a slave station.

5. A communication system according to claim 4, wherein said data sending allowance signal sending means in said master station sends at first a data sending allowance signal to one of said slave stations which has sent said additional request, when said additional request is detected.

6. A communication system according to claim 5, wherein said data sending allowance signal sending means comprises;
   a successive allowance limiting means for changing an address of said data sending allowance signal to another one of said slave stations from which a request for sending data is memorized in said request memorizing means, when a predetermined number of successive allowances are output to one of said slave stations.

7. A communication system according to claim 5, wherein a priority is assigned for each of said slave stations regarding a data sending operation;

said data sending allowance signal sending means comprising:
priority comparing means for comparing the priority of a first one of said slave stations to which a data sending allowance signal is currently output, with a priority of a second one of said slave stations from which a request for sending data is received; and
address changing means for changing an address of said data sending allowance signal to said second one of said slave stations from which said request for sending data is received, when the priority of said first one of said slave stations to which a data sending allowance signal is currently output, is lower than the priority of said second slave station from which said request for sending data is received.

8. A communication system according to claim 7, wherein each of said request and said additional request includes information of the priority of said second one of said slave stations from which said request for sending data is output.

9. A communication system according to claim 1, wherein a priority is assigned for each of said slave stations regarding a data sending operation;
each of said plurality of slave stations further comprising a priority signal output means for outputting said assigned priority when sending said request for sending data, on said transmission line;
said request memorizing means in said master station further memorizing said priority for each request memorized therein; and
said data sending allowance signal sending means sending the data sending allowance signals in the order of the priorities of said slave stations which are memorized in said request memorizing means.

10. A communication system according to claim 1, wherein said master station further comprises polling address dispersing means for controlling said requested quantity sending allowance signal sending means so that said requested quantity sending allowance signal sending means sends a requested quantity sending allowance signal to one of said slave stations to which a data sending allowance signal is concurrently sent from said data sending allowance signal sending means.

11. A communication system according to claim 1, wherein said master station further comprises a polling address dispersing means for controlling said request sending allowance signal sending means so that said request sending allowance signal sending means sends a request sending allowance signal to one of said slave stations which is different from another one of said slave stations to which a data sending allowance signal is concurrently sent from said data sending allowance signal sending means.

12. A communication system according to claim 1, wherein said master station further comprises:
preceding polling address memorizing means for memorizing polling addresses in a predetermined number of preceding polling cycles; and
polling address control means for controlling said request sending allowance signal sending means so that said request sending allowance signal sending means sends a request sending allowance signal to one of said slave stations which is different from another one of said slave stations to which an allowance signal is concurrently sent from said data sending allowance signal sending means, and is different from said slave stations corresponding to said polling addresses in said predetermined number of polling cycles.

13. A communication system according to claim 1, wherein said master station further comprises:
preceding polling address memorizing means for memorizing polling addresses in a predetermined number of preceding polling cycles; and
polling address control means for controlling said requested quantity sending allowance signal sending means so that said requested quantity sending allowance signal sending means sends a requested quantity sending allowance signal to a slave station which is different from a slave station to which a data sending allowance signal is concurrently sent from said data sending allowance signal sending means and is different from said slave corresponding to said polling addresses in said predetermined number of polling cycles.

14. A communication system according to claim 1, wherein said request sending allowance signal sending means sends said request sending allowance signals less frequently than said data sending allowance signals are sent.

15. A communication system comprising:
a master station;
a plurality of slave stations;
a transmission line for transmitting a signal between said master station and said plurality of slave stations;
each of said slave stations comprising:
data holding means for holding data which is to be sent to said master station; and
data quantity indicating means for indicating a quantity of data held in said data holding means;
said master station comprising:
frame generating means for successively generating and transmitting a frame which contains information;
requested quantity sending allowance signal generating means for generating, for each frame, a requested quantity sending allowance signal which addresses one of said plurality of slave stations to give an allowance to send said quantity of data requested to be sent, on said transmission line;
data quantity receiving means for receiving said quantity of data from one of said plurality of slave stations;
requested quantity memorizing means for memorizing one or more quantities of data from one of more of said slave stations; and
data sending allowance signal generating means for generating, for each frame, a data sending allowance signal which addresses one of said plurality of slave stations to give an allowance to send data, on said transmission line, according to a data quantity which is sent from one of said slave stations, and which is memorized in said requested memorizing means;
said frame generating means inserting both said requested quantity sending allowance signal and said data sending allowance signal in each frame when said frame generating means generates and transmits a frame;
each of said slave stations further comprising:
requested quantity sending allowance signal detecting means for detecting a requested quantity sending allowance signal which addresses its own slave station, on said transmission line;

data sending allowance signal detecting means for detecting a data sending allowance signal which addresses its own slave station, on said transmission line;

requested data quantity sending means for sending a quantity of data requested to be sent from its own slave station, on said transmission line to said master station when its own slave station detects a requested quantity sending allowance signal which addresses its own slave station; and data sending means for sending data on said transmission line to said master station when its own slave station detects a data sending allowance signal which addresses its own slave station.

16. A communication system according to claim 15, wherein said master station further comprises:

history memory means for memorizing a history of said data sending allowance signals which are output in a time duration, and said time duration is predetermined corresponding to a time from a moment a requested quantity sending allowance signal is output from said master station, to a moment one of said slave stations addressed by the requested quantity sending allowance signal detects the requested quantity sending allowance signal; and memorized quantity correcting means for subtracting a quantity corresponding to a number of data sending allowance signals to one of said slave stations, which are memorized in said memory means, from said quantity of data which is received from said one of said slave stations, before storing the quantity in said requested quantity memorizing means.

17. A communication system according to claim 15, wherein each of said slave stations further comprises an additional request sending means for sending an additional request for sending data to said master station in additional to data which is sent to said master station in the same frame as the additional request, when its own slave station detects a data sending allowance signal which addresses is own slave station.

18. A communication system according to claim 17, wherein said master station further comprises an additional request detecting means for detecting said additional request which is sent from one of said slave stations.

19. A communication system according to claim 18, wherein said data sending allowance signal sending means in said master station sends at first a data sending allowance signal to one of said slave stations which has sent said additional request, when said additional request is detected.

20. A communication system according to claim 18, wherein said data sending allowance signal sending means comprises;

successive allowances limiting means for changing an address of said data sending allowance signal to another one of said slave stations from which a quantity of data requested to be sent is memorized in said requested quantity memorizing means, when a predetermined number of successive allowances are output to one of said slave stations.

21. A communication system according to claim 18, wherein a priority is assigned to each of said slave stations regarding a data sending operation;

said data sending allowance signal sending means comprises:

a priority comparing means for comparing the priority of a first one of said slave stations to which a data sending allowance signal is currently output, with a priority of a second one of said slave stations from which a quantity of data requested to be sent is received; and address changing means for changing an address of said data sending allowance signal to said second one of said slave stations from which said quantity of data requested to be sent is received, when the priority of said first one of said slave stations to which a data sending allowance signal is currently output, is lower than the priority of said second one of said slave stations from which said quantity of data requested to be sent is received.

22. A communication system according to claim 21, wherein each of said quantity of data requested to be sent and said additional request further includes information of the priority of one of said slave stations from which said request for sending data is output.

23. A communication system according to claim 15, wherein a priority is assigned to each of said slave stations regarding a data sending operation;

each of said plurality of slave stations further comprises priority signal output means for outputting said assigned priority when sending said quantity of data requested to be sent, on said transmission line;

said requested quantity memorizing means in said master station further memorizing said priority for each quantity of data requested to be sent, which is memorized therein; and said data sending allowance signal sending means sending the data sending allowance signals in the order of the priorities of said slave stations which are memorized in said requested quantity memorizing means.

24. A communication system according to claim 15, wherein said requested quantity sending allowance signal sending means sends a requested quantity sending allowance signals less frequently than said data sending allowance signals are sent.

* * * * *

UNITED STATES PATENT AND TRADEMARK OFFICE
CERTIFICATE OF CORRECTION

PATENT NO. : 5,166,675

DATED : NOVEMBER 24, 1992

INVENTOR(S) : SHIGEO AMEMIYA ET AL.

It is certified that error appears in the above-identified patent and that said Letters Patent is hereby corrected as shown below:

Col. 1, line 31, "B ISDN" should be --B-ISDN--.

Col. 13, line 29, "to sent" should be --to be sent--.

Col. 14, line 46, "REQ DQ" should be --REQ-DQ--.

Col. 23, line 9, "FIG. 12 is also can be" should be --FIG. 12 also can be--;
line 45, "$P_1$" should be --$P_3$--;
line 46, "07," should be --87,--.

Col. 34, line 59, "a" should be deleted.

Col. 36, line 16, "slave correspond-" should be --slave stations correspond- --.

Col. 37, line 45, "is" should be --its--.

Signed and Sealed this

Twenty-third Day of November, 1993

Attest:

BRUCE LEHMAN

*Attesting Officer*    Commissioner of Patents and Trademarks

UNITED STATES PATENT AND TRADEMARK OFFICE
CERTIFICATE OF CORRECTION

PATENT NO. : 5,166,675

DATED : NOVEMBER 24, 1992

INVENTOR(S) : SHIGEO AMEMIYA ET AL.

It is certified that error appears in the above-identified patent and that said Letters Patent is hereby corrected as shown below:

<u>IN THE DRAWINGS</u>

FIG. 31, Sheet 21 of 24, Block 907, "$TENO_p$" should be --$TENO_r$--.

FIG. 32, Sheet 22 of 24, Block 913, "YES" should be --NO--;
Block 913, "NO" should be --YES--;
Block 916, "LOY" should be --LOW--.

FIG. 33A, Sheet 23 of 24, "DMUX" should be labelled --141--.

Col. 14, line 46, "43'" should be --42'--;
line 50, "43'" should be --42'--.

Col. 16, line 28, "32" should be --36--.

Col. 18, line 46, "73" should be --72--.

Col. 20, line 53, "100" should be --10--.

Col. 21, line 2, "51" should be --81--;
line 6, "51" should be --81--;
line 46, "33" should be --82--.
line 58, "36' 116" should be --36, 116,--;
line 59, "14, and 16," should be --15, and 17,--.

Col. 22, line 51, "63" should be --62--;
line 55, "63" should be --62--.

UNITED STATES PATENT AND TRADEMARK OFFICE
CERTIFICATE OF CORRECTION

PATENT NO. : 5,166,675

DATED : NOVEMBER 24, 1992

INVENTOR(S) : SHIGEO AMEMIYA ET AL.

It is certified that error appears in the above-identified patent and that said Letters Patent is hereby corrected as shown below:

Col. 23, line 55, "register 85" should be --register 84--;
"register 84" should be --register 85--.

Col. 26, line 51, "second" should be --first--;
line 55, "second" should be --first--.

Col. 30, line 67, before "contains" insert --96--; and
"number 96" should be --number--.

Col. 32, line 17, "second" should be --first--.

Col. 33, line 27, "shown FIGS. 2 and 3." should be --shown in FIG. 2.--.

Signed and Sealed this

Twenty-eighth Day of June, 1994

Attest:

BRUCE LEHMAN

*Attesting Officer*    Commissioner of Patents and Trademarks